United States Patent
Yoshino

Patent Number: 5,995,197
Date of Patent: Nov. 30, 1999

[54] FILM INFORMATION OBTAINING APPARATUS

[75] Inventor: Tatsuo Yoshino, Kanagawa, Japan

[73] Assignee: Fuji Photo Film Co., Ltd., Kanagawa, Japan

[21] Appl. No.: 08/958,447

[22] Filed: Oct. 27, 1997

[30] Foreign Application Priority Data

Oct. 28, 1996 [JP] Japan .................................. 8-285365
Oct. 28, 1996 [JP] Japan .................................. 8-285366

[51] Int. Cl.⁶ ..................................................... G03B 27/52
[52] U.S. Cl. ............................................... 355/41; 355/40
[58] Field of Search ................................ 355/40, 41, 38; 382/162, 164; 354/402

[56] References Cited

U.S. PATENT DOCUMENTS

| | | | |
|---|---|---|---|
| 4,650,316 | 3/1987 | Matsumoto | 355/55 |
| 5,231,656 | 7/1993 | Sakuma et al. | 378/166 |
| 5,557,688 | 9/1996 | Nakamura | 382/164 |
| 5,703,672 | 12/1997 | Terashita | 355/38 |
| 5,719,661 | 2/1998 | Terashita | 355/38 |
| 5,729,328 | 3/1998 | Kimura et al. | 355/40 |

FOREIGN PATENT DOCUMENTS 63-189850  8/1988  Japan ............................. G03B 27/32

*Primary Examiner*—Safet Metjahic
*Assistant Examiner*—Hung Henry Nguyen
*Attorney, Agent, or Firm*—Sughrue, Mion, Zinn, Macpeak & Seas, PLLC

[57] ABSTRACT

An apparatus for obtaining information from a film includes a CCD line sensor for dividing a photographic film into a multiplicity of portions to meter portions in a predetermined range, including the image recording range on the photographic film, to sequentially output photometric data; an optical film for reducing a light beam made incident on the CCD line sensor from a region in the predetermined range and outside the image recording range on the photographic film; photometric condition adjusting component for adjusting the photometric condition of the CCD line sensor such that it corresponds to the quantity of a light beam made incident on the CCD line sensor from the image recording range; sampling circuits for extracting, from photometric data output from the CCD line sensor, photometric data of a portion on the photographic film in which a predetermined optical characteristic corresponding to information, which must be detected or obtained from the photographic film, exists by a film edge detecting sampling circuit, film movement detecting sampling circuit, a DX code detecting sampling circuit, a frame position detecting sampling circuit, a frame size detecting sampling circuit and an exposure controlling image data sampling circuit and memories arranged to store photometric data extracted by the sampling circuits and connected to each sampling circuit.

17 Claims, 11 Drawing Sheets

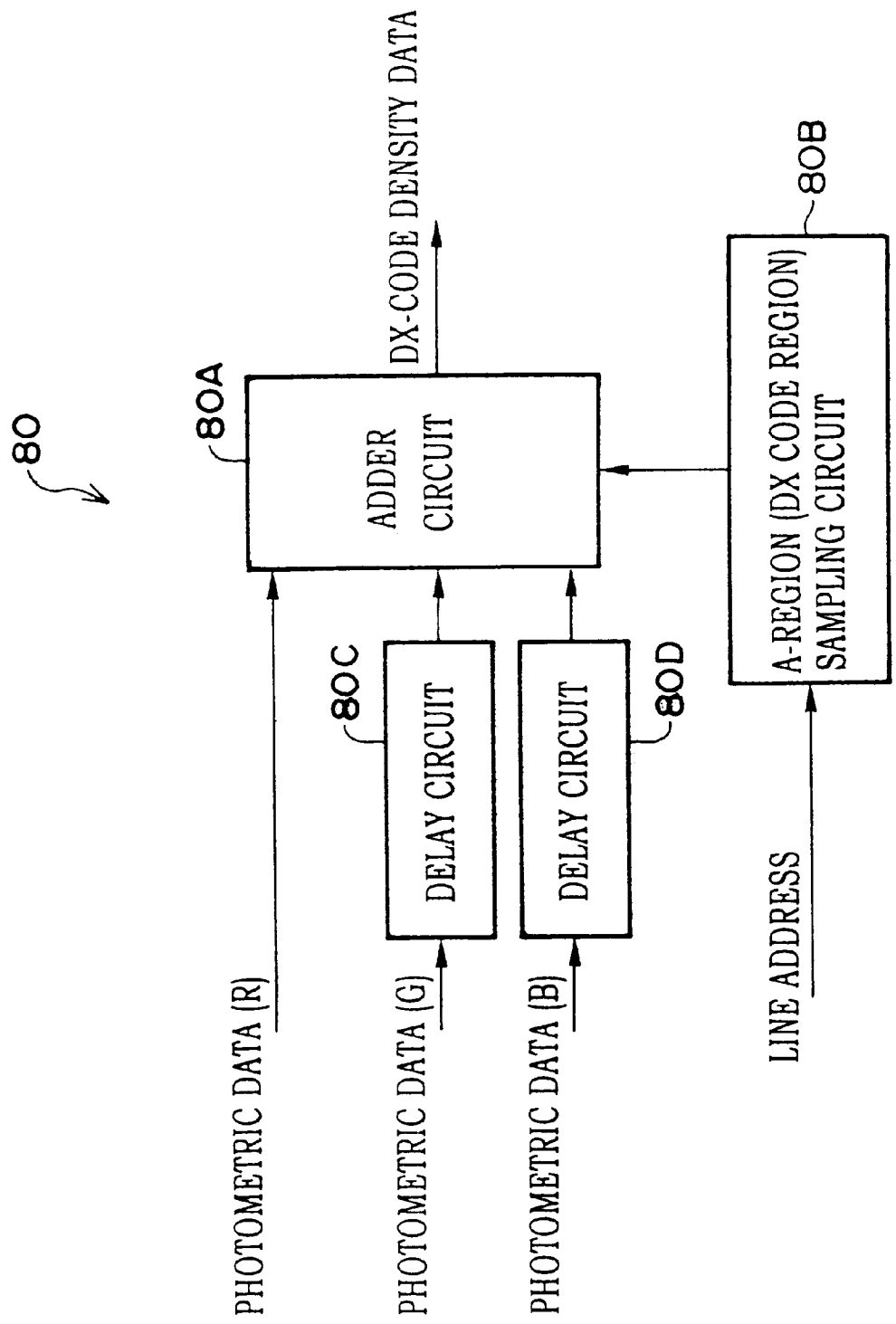

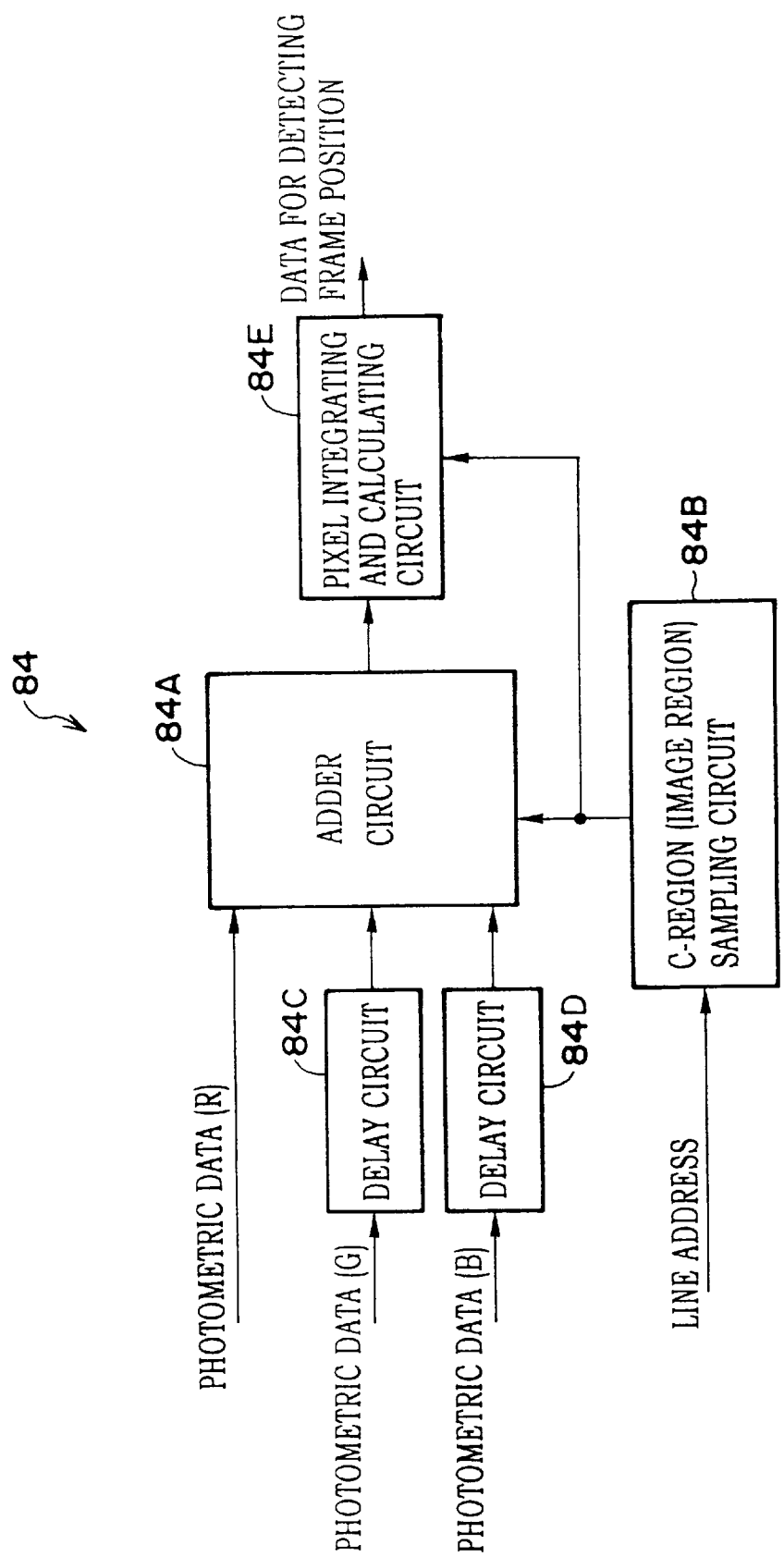

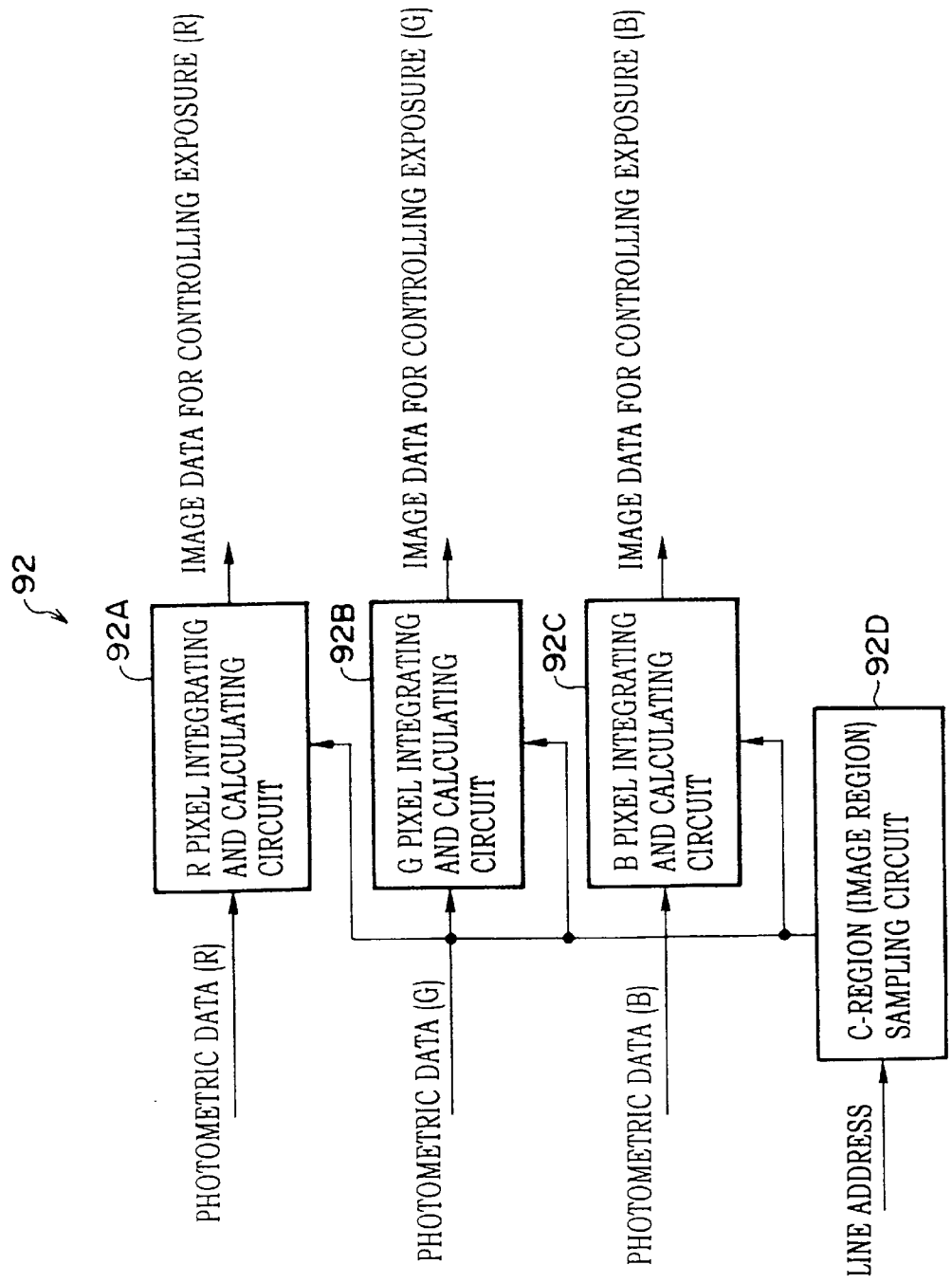

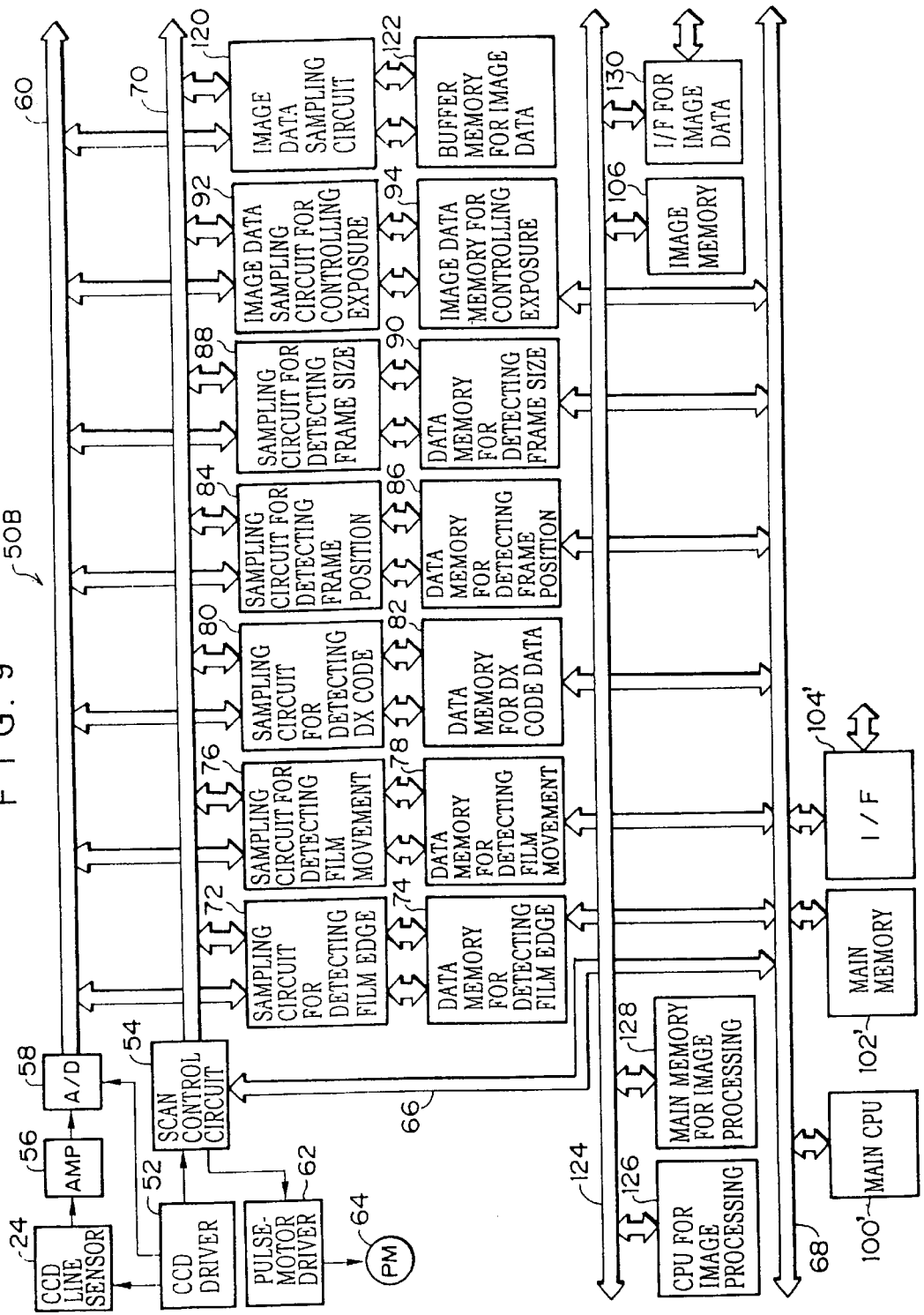

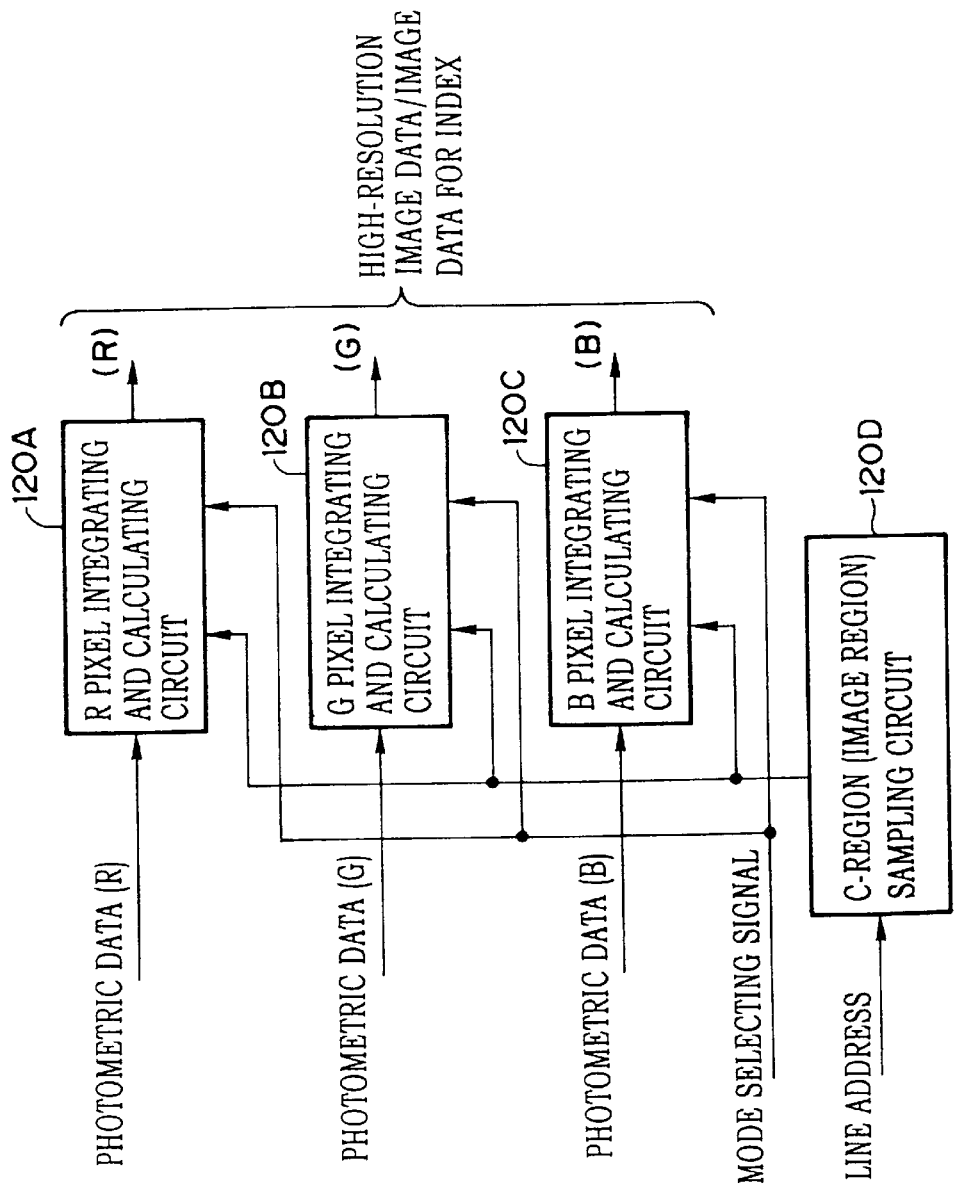

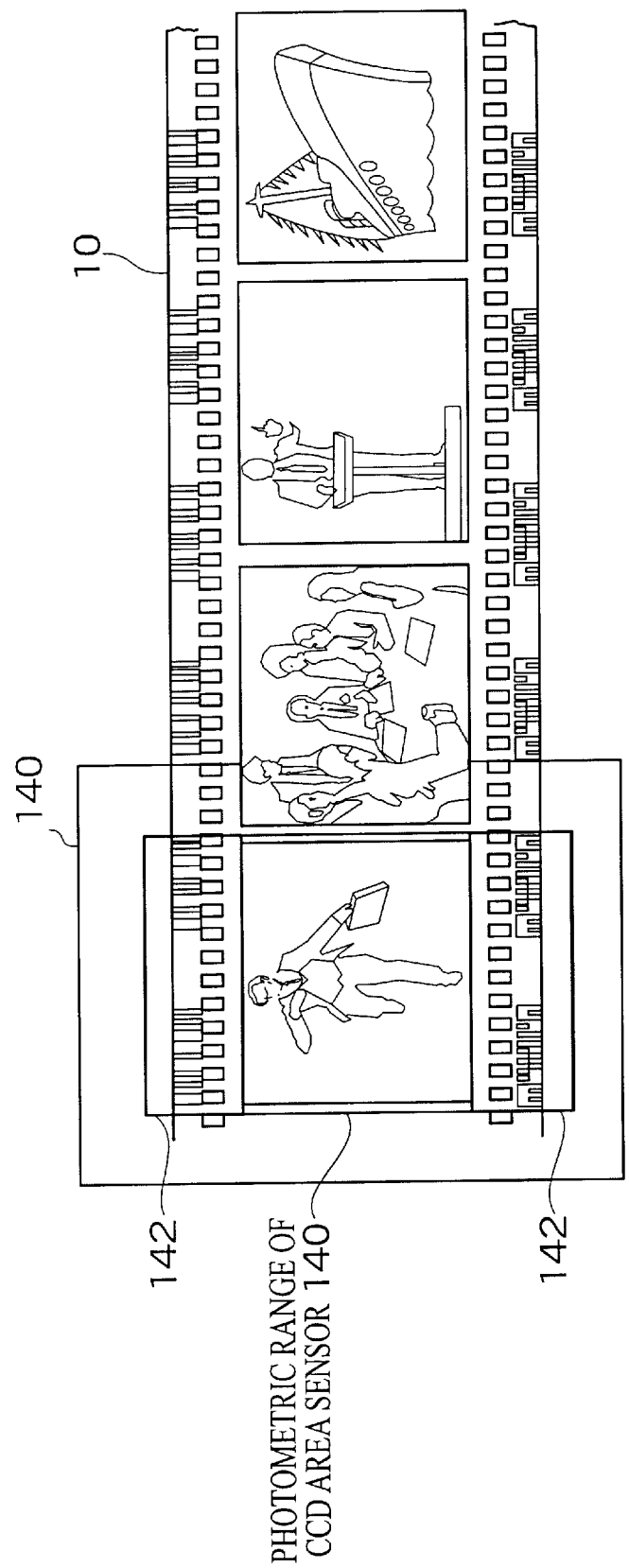

FILM INFORMATION OBTAINING APPARATUS

BACKGROUND OF THE INVENTION

1. Field of the Invention

The present invention relates to a film information obtaining apparatus, and more particularly to a film information obtaining apparatus having a photometric unit for metering a predetermined range larger than an image recordable region of a photographic film to detect and obtain various information items from the photographic film.

2. Description of Related Art

A film printer for exposing images recorded on a photographic film, such as a negative film, to a light-sensitive material, such as photographic paper, must detect information including the type of the photographic film, the size of the image frame (for example, the conventional size (having an aspect ratio of 2:3)/panorama size/high-vision size) and so on, the quantity of characteristic of the image (for example, the density and color tone) which must be exposed, so as to determine an exposing condition of the image. When the image is exposed, the image must be brought to a predetermined exposing position. To bring the image to the exposing position, a movement state of the photographic film and the like must be detected. In addition, the position of an image recorded on the photographic film must be detected.

Also an image processing apparatus for reading an image recorded on a photographic film by a scanner to record the thus obtained image onto a recording medium or to display the image on a display unit must detect various information items from the photographic film. Accordingly, a structure has generally been employed in which photosensors corresponding to various information items to be obtained, or to be detected are provided to detect the various information items in accordance with the data outputted from each of the photosensors.

That is, for example, a DX code is read by a DX code detecting sensor, the contents of the DX code are determined in accordance with the data outputted from the foregoing sensor so as to detect the type of the film, the light transmissivity of a region in which the edge of the image frame exists is detected by a frame detecting sensor, and the position of the image frame and the size of the frame are detected in accordance with the data outputted from the sensor. Moreover, the photographic film is moved in such a manner that the image frame is brought to the exposing position, and the mask and the exposure factor are controlled. In addition, the image brought to the exposing position is metered by a photometric sensor, the exposing condition is determined in accordance with the image data obtained by the photometric operation and the image frame brought to the exposing position is printed to a photographic paper.

However, the fact that the above-mentioned structure requires a multiplicity of photosensors has a problem in that the cost of the apparatus cannot be reduced.

Another structure is known in which one of sensors is commonly used, the data outputted from the common sensor is temporarily sorted in a common memory and information which is included in various information items to be detected and which has been obtained from the common sensor is subjected to an analysis, so that the corresponding data only is selectively extracted from the data stored in the common memory to detect it.

For example, a DX code detecting sensor and a frame detecting sensor are formed into a common sensor and a line sensor for dividing one line into tens of pixels to meter one line is provided so that the data outputted from the line sensor is stored in the common memory. Only the data corresponding to the region, in which the DX code on the photographic film has been recorded, is extracted from the common memory, and the contents of the extracted data are analyzed so that the type of the film is detected. Then, only the data corresponding to the region, in which the edge of the image frame of the photographic film exists, is extracted from the common memory to analyze the contents of the extracted data so that the position of the image frame and the size of the frame are detected.

However, the foregoing structure has a problem in that all data items outputted from the common sensor are stored in the common memory and the data stored in the common memory includes a large quantity of data which is not required to detect each information. That is, the process of selectively extracting only the data corresponding to information, which must be detected, from the common memory (in other words, a process for determining the address of a region, in which the data corresponding to information which must be detected is stored, and extracting the data stored in the region having the determined address) becomes too complicated. Thus, there arises a problem in that excessively long time is required to a complete detection of all of various information items which must be detected.

In view of the foregoing problem of the large cost, it might be considered feasible to employ a structure in which a single photosensor (for example, a line sensor or an area sensor) having a multiplicity of light receiving elements divides substantially the overall surface of the photographic film including spaces outside the image recording regions into a plurality of pixels for metering the same, and detecting the above-mentioned various information items in response to the signals outputted from the photosensor.

Since the photographic film has perforations formed on the two sides in the widthwise direction thereof (and sometimes cut portions, such as notches), an incidental light beam allowed to pass through the perforation or the notch has a largest light quantity among light beams made incident from various positions of the photographic film. Therefore, the photometric condition of the photosensor must be adjusted to prevent saturation of the output from the photosensor and the output from a signal processing circuit disposed next to the photosensor even if the light beam allowed to pass through the perforation or the like is made incidenton thephotosensor. However, the quantity of the light beam allowed to pass through the image recording region of the photographic film is smaller than the above-mentioned maximum quantity of light for at least a quantity corresponding to the base density of the photographic film. Therefore, the above-mentioned adjustment of the photometric condition raises a problem in that the dynamic range permitted for the photometric process with respect to the image is reduced (the ratio of the highest level of a photometric signal and the lowest level of the same is lowered).

A structure of a scanner provided for the above-mentioned image processing apparatus or the like for the purpose of accurately reading an image recorded on a photographic film has been known, in which the photometric condition (for example, charge storage period of the image photometric sensor and the quantity of stop which is adjusted by a stop provided on the light incidental side of the photosensor) is changed depending on whether the photographic film is a negative film or a positive film, so as to adjust the dynamic range for the photometric process with respect to the image on the film for each of the photographic films such tat the dynamic range becomes maximum. However, even a scanner of this type also requires photosensors exclusively for detecting information other than information of the image itself apart from the foregoing photometric sensor.

A technique is disclosed in Japanese Patent Application Laid-Open (JP-A) No. 63-189850, in which the dynamic range is changed between an operation for reading an image on a photographic film and an operation for detecting the edge of the image. However, the above-mentioned technique has not contrivance for detecting information also from a region of the photographic film in which a perforation or notch is formed by using a photometric sensor for metering an image.

SUMMARY OF THE INVENTION

In view of the foregoing, an object of the present invention according to the first aspect thereof is to provide an apparatus for obtaining information of a film which has a simple structure and which is capable of detecting or obtaining various information items, which must be detected or obtained from a photographic film, in a short time.

Another object of the present invention according to the second aspect thereof is to provide a film photometric apparatus which is simply structured in view of the foregoing and which is capable of accurately metering an image recorded on a photographic film and accurately detecting information about the photographic film also from a portion outside the image recording range of the photographic film.

In order to achieve the object of the first aspect, according to a first aspect of the present invention, there is provided an apparatus for obtaining information of a film, comprising: single photometric means for dividing a photographic film into a multiplicity of portions to meter the photographic film, and sequentially outputting photometric data of the multiplicity of portions in a predetermined range on the photographic film including an image recording range; extracting means for extracting, from photometric data outputted from the photometric means, photometric data of portions on the photographic film, in which a predetermined optical characteristic corresponding to information, which must be detected or obtained from the photographic film, exists; and storage means for storing photometric data extracted by the extracting means.

The structure is arranged such that a photographic film is divided into a multiplicity of portions and metered by the single photometric means, and the photometric means sequentially outputs photometric data of each portion on the photographic film. The extracting means extracts, from photometric data outputted from the photometric means, photometric data of a portion on the photographic film, on which a predetermined optical characteristic corresponding to information, which must be detected or obtained from the photographic film, exists.

Information, which must be detected or obtained from the photographic film, is, for example, the type of the photographic film, the size of the frame of an image recorded on the photographic film, a position of an image recorded on a photographic film, the quantity of characteristic of the image recorded on the photographic film, a state of the photographic film (for example, a state of movement of the photographic film and the position of the edge of the photographic film) and image data which can be obtained by metering an image recorded on the photographic film.

If information, which must be detected or obtained, is the type of the photographic film, the extracting means extracts, for example, photometric data of a portion on the photographic film in which a DX code has been recorded, as the portion in which a corresponding optical characteristic exists. If information, which must be detected or obtained, is the size of the frame of the image or the position of the image recorded on the photographic film, the extracting means extracts photometric data of a portion on the photographic film in which the edge of the image exists as the portion in which the corresponding optical characteristic exists. If the information, which must be detected or obtained, is the quantity of the characteristic of the image recorded on the photographic film, the extracting means extracts photometric data of a portion in which the image is recorded on the photographic film as the portion in which the corresponding optical characteristic exists. If information, which must be detected or obtained, is image data, the extracting means extracts photometric data of a portion on the photographic in which the image has been recorded as the portion in which the corresponding optical characteristic exists. If information, which must be detected or obtained, is a state of the photographic film (for example, a state of movement of the photographic film or the position of the edge of the photographic film), the extracting means extracts photometric data of a portion on the photographic film in which perforations are formed or a portion adjacent to the edge of the photographic film as the portion in which the corresponding optical characteristic exists.

Photometric data extracted by the extracting means is stored in the storage means. Information, which must be detected or obtained from the photographic film, can be detected or obtained in accordance with the photometric data stored in the storage means. Since the storage means stores only the extracted photometric data required to detect or obtain corresponding information, only photometric data required to perform detection or obtaining can be extracted from the storage means in a short time when detection or obtaining of various information items is performed. Therefore, detection or obtaining of various information items can be performed in a short time in accordance with photometric data stored in the storage means.

When various information items are detected or obtained from a photographic film, the extracting means, performs, for each of the various information items, extraction of photometric data of aportion on the photographic film, in which an optical characteristic corresponding to any of the various information items, which must be detected or obtained, exists. The storage means is able to store various photometric data items extracted by the extracting means in such a manner that the photometric data is made to relate to each of various information items.

If information, which must be detected or obtained from a photographic film, is various information items, the photometric means sequentially outputs photometric data of each portion on the photographic film. Thus, the extracting means, from output photometric data, extracts photometric data of a portion on the photographic film in which the DX code has been recorded, photometric data of a portion on the photographic film in which the edge of the image exists, photometric data of a portion on the photographic film in which the image has been recorded, a portion on the photographic film in which the perforation are formed and photometric data of a portion on the photographic film adjacent to the position of the edge. The various extracted photometric data items are related to the various information items so as to be stored in the storage means.

Various information items, which must be detected or obtained, can be detected or obtained in accordance with various photometric data items. Since the storage means stores only photometric data required to detect or obtain corresponding information, only the photometric data required to perform detection or obtaining can be extracted from the storage means in a short time when detection or obtaining of various information items is performed. Therefore, detection or obtaining of various information items from a photographic film can be performed in a short time in accordance with photometric data stored in the storage means.

Since the extracting means enables a variety of photometric data items corresponding to a variety of information items which must be detected to be obtained from a result of a photometric operation performed by the single photometric means and thus a plurality of photometric means is not required, the structure of the apparatus can be simplified and the cost can be reduced.

Information, which must be detected or obtained from the photographic film, is not a predetermined information item. If information, which must be detected or obtained from the photographic film, is indefinite information, the portion on the photographic film from which photometric data outputted from the photometric means can be changed. The extracting means is required to change the portion on the photographic film from which photometric data is extracted in accordance with the type of information, which must be detected or obtained from the photographic film.

Also the number of types of information items, which must be detected or obtained from a photographic film, is not limited to a definite number. There is a possibility that the number of types of information, which must be detected or obtained, is an indefinite number such that the frequency of detection or obtaining specific information (for example, a state of movement of the photographic film or the position of the edge of the photographic film) is lower than the frequency of detection or obtaining of another information item. In this case, the extracting means is required to extract only the photometric data of a portion on the photographic film in which the optical characteristic corresponding to information, which must be detected or obtained, exists.

The above-mentioned type of the photographic film, the size of the image frame, the image recorded position on the photographic film and the state of the photographic film exemplified as example so formation, which must be detected or obtained can be detected without a necessity of performing an operation of metering the photographic film as is required to obtain image data by metering an image recorded on a photographic film.

When information is detected or obtained as described above, it is preferable that the format of photometric data, which is stored in the storage means, be a data format from which information can easily be detected or obtained. For example, the data format is required to be a format corresponding to a result of a process of photometric data outputted from the photometric means, such as a thinning process or a process for adding or subtracting photometric data of a plurality of portion on the photographic film or a process for calculating the average value. Data in the above-mentioned data format can be obtained, in which a processing means is provided which processes photometric data, which is stored in the storage means, in accordance with the data format of information which corresponds to photometric data and which must be detected or obtained.

The structure of the processing means is formed such that photometric data extracted by the extracting means is, by a processing means, processed into data in a data format from which information can easily be detected or obtained and the processed data is stored in the storage means. Therefore, various information items can be detected or obtained in a shorter time. Since the quantity of data is generally reduced if the foregoing process is performed, the capacity of the storage means required to store photometric data can be reduced.

If information, which must be detected or obtained from a photographic film is any one of the type and state of the photographic film, the size and the recorded position of an image recorded on the photographic film and the quantity of the characteristic of the image recorded on the photographic film, photometric data stored in the storage means must be processed to an analysis or a calculation when information, which must be detected or obtained, is detected or obtained.

In this case, a processing means for detecting the type and state of the photographic film, the size and the recorded position of the image recorded on the photographic film and the quantity of the characteristic of the image is provided.

Since image data generally has a great data quantity, it is considered that a long time is required to process the photometric data stored in the storage means to correspond to image data. In view of the foregoing, if one of information items, which must be detected or obtained from the photographic film, is image data which can be obtained by metering an image recorded on the photographic film, it is preferable that the apparatus comprises first processing means for subjecting photometric data corresponding to image data stored in the storage means to a first predetermined process and second processing means for subjecting photometric data corresponding to information except for the image data stored in the storage means to a second predetermined process.

The structure of the apparatus comprising first processing means and second processing means is such that photometric data corresponding to the image data stored in the storage means is subjected to a predetermined process by the first processing means and photometric data corresponding to information except for image data is subjected to another predetermined process by the second processing means. Therefore, the load applied to the processing means can be dispersed as compared with the structure in which the process of a variety of photometric data items stored in the storage means is performed by a single processing means. Therefore, the time required to detect various information items about the photographic film can further more be shortened.

Since photometric data corresponding to image data and arranged to be stored in the storage means has a large data quantity, it can be considered that the bus is used for a long time when the photometric data is transferred through the bus and the process of another photometric data item is obstructed.

In view of the foregoing, it is preferable that the storage means is composed of a first storage portion connected to a first bus and arranged to store photometric data corresponding to image data and a second storage portion connected to a second bus and arranged to store photometric data corresponding to information except for image data. Moreover, it is preferable that the first processing means is connected to the first bus and the second processing means is connected to the second bus. As a result, even if photometric data corresponding to image data and stored in the first storage portion is subjected to a predetermined process, such as transference, the process of another photometric data item can be performed smoothly by the second processing means using the second bus.

According to a second aspect of the present invention, there is provided a film photometric apparatus and comprising irradiation means for irradiating a predetermined range larger than an image recording range on a photographic film with a light beam; single photometric means on which a light beam is made incident from the predetermined range on the photographic film and which divides the predetermined range into a multiplicity of portions to meter the multiplicity of the portions; light reducing means for reducing a light beam made incident on the photometric means from a region in the predetermined range, yet outside the image recording range on the photographic film; photometric condition adjusting means for adjusting the photometric condition adapted to the photometric means to the condition corresponding to the quantity of the light beam made incident on the photometric means from the image recording range; and detecting means for detecting a predetermined information item existing outside the image recording range on the photographic film in accordance with a result of the photometric operation of a region in the predetermined range yet outside the image recording range.

In the structure of another embodiment the single photometric means is provided, on which a light beam from a predetermined range larger than the image recording range on the photographic film is made incident and which divides the predetermined range into a multiplicity of portions to meter the portions. The photometric condition of the photometric means is, by the photometric condition adjusting means, adjusted to be adaptable to the quantity of a light beam made incident from the image recording range on the photometric means. As a result, the image recorded on the photographic film can be metered with a satisfactory accuracy (a wide dynamic range). Thus, photometric data (image data) for accurately expressing the number of gradients of the image recorded on the photographic film with a larger number of gradients can be obtained.

The photometric condition is adjusted by the photometric condition adjusting means is performed in such a manner that the level of a signal outputted from the photometric means corresponding to a light beam from a density through portion is not saturated, yet the same is made to be substantially the highest level if the density through portion exists which has the density which substantially coincides with the density of the film base of the photographic film. Since the density of the through portion (the density of the film base) is constant for each of the types of the photographic films, the density can be detected by detecting the type of the photographic film (or the density of the film base may be obtained by a photometric operation).

The adjustment of the photometric condition performed by the photometric condition adjusting means is performed such that a lowest density portion in the image recording range on the photographic film is detected, and the photometric condition is adjusted in such a manner that the level of a signal outputted from the photometric means corresponding to a light beam from the lowest density portion is not saturated, yet the same is made to be substantially the highest. The lowest density portion in the image recording range can be detected by previously metering (a so-called previous photometric operation of) the image.

If the photometric condition is adjusted as described above, the quantity of a light beam made incident upon the photometric means from a portion outside the image recording range on the photographic film and having cut portions, such as perforations or notches is enlarged excessively. Thus, the signal outputted from the photometric means corresponding to the light beam made incident from the portion having the perforations or notches is saturated. A result of the photometric operation of a region outside the image recording range is used by the detecting means to detect a predetermined information item (for example, the DX code, the positions of the perforations or the position of the edge of the photographic film) existing outside the image recording range on the photographic film. If the signal outputted from the photometric means is saturated as described above, the accuracy to detect a predetermined information item deteriorates.

However, the structure of the other embodiment has the light reducing means which reduces a light beam made incident on the photometric means from a region in the predetermined range on the photographic film and on the outside range of the image recording range. Therefore, the quantity of a light beam made incident upon the photometric means from the portion outside of the image recording range on the photographic film and having the holes or cut portions is reduced by the light reducing means. Thus, saturation of the signal outputted from the photometric means corresponding to the light beam made incident upon the photometric means from the portion having the holes or cut portions can be prevented. Therefore, the detection means is able to accurately detect information existing on the outside range of the image recording range on the photographic film.

According to the second aspect of the present invention, an image recorded on a photographic film can accurately be metered by a simple structure having a single photometric means. Moreover, information existing outside the image recording range on the photographic film can accurately be detected. Therefore, the cost of the film photometric apparatus according to the present invention can be reduced.

When an image recorded on a photographic film is metered by the photometric means having the structure in which an incidental light beam is decomposed into color components and then metered, the sensitivity of the photometric means is generally adjusted for each of the color components in such a manner that the color tone of a density through portion in the image recording range of the photographic film can be detected as a white portion as a result of a photometric operation (if the photographic film is a negative film, the color tone of the through portion is substantially orange). If the photometric means having the density adjusted for each color component is employed as described above, the minimum light reduction quantity required to prevent saturation of the signal for each color component outputted from the photometric means is different among the color components with respect to a light beam (which is generally a white light beam) made incident upon from the portion on the outside range of the image recording range on the photographic film having the holes or cut portions.

Therefore, if the photometric means having the sensitivity adjusted for each color component as described above is employed as the photometric means according to the present invention and the light reducing means according to the present invention is an optical filter, such as an ND filter, having a spectrum characteristic with which the reduction of light for each color component is made to be substantially constant is employed, the quantity of reduction of light realized by the optical filter must be enlarged to prevent saturation of the signals with respect to all color components outputted from the photometric means. Therefore, there arises a problem in that the dynamic range of a signal of a specific color component outputted from the photometric means corresponding to a light beam from the portion on the outside the image recording range on the photographic film is reduced.

Therefore, the structure has a structure such that the light reducing means is an optical film having a spectral characteristic approximating the spectral characteristic of the film base of the photographic film.

The structure is arranged such that the light reducing means is the optical filter having the spectral characteristic approximating the spectral characteristic of the film base of the photographic film. Therefore, if the photometric means has the sensitivity for each color component adjusted in such a manner that the color tone of the density through portion in the image recording range of the photographic film is detected as a white portion as a result of the photometric operation, the level of the signal for each of the color component outputted from the photometric means with respect to a light beam made incident from the portion of the photographic film having holes or cut portions through the optical filter can be made to be substantially constant. Therefore, the dynamic range of the signal for each of the color component outputted from the photometric means corresponding to the light beam from the outside of the image recording range on the photographic film can be widened. Thus, detection of various information items from outside the image recording range on the photographic film can be performed accurately.

The spectrum characteristic of the film base of a negative film, which is one of photographic films, generally satisfies transmittance of blue light Tb≦transmittance of green light Tg≦transmittance of red light Tr. When a negative film is used as the photographic film, the photometric means according to the present invention has a structure in which an incidental light beam is decomposed into color components and metered and the sensitivity of the photometric means is adjusted in such a manner that the color tone of the through portion in the image recording range of the photographic film is detected as a white portion as a result of a photometric operation, it is preferable that the light reducing means is an optical filter which satisfies transmittance of blue light Tb≦transmittance of green light Tg≦transmittance of red light Tr.

The structure cannot always make constant the level of the signal for each of the color components outputted from the photometric means with respect to a light beam made incident from the portion outside the image recording range on the photographic film having holes or cut portions through the optical filter. However, the levels of the signals for respective color components outputted from the photometric means can be approximated as compared with the structure in which an optical filter, such as an ND filter, having a substantially constant spectrum characteristic with which the quantity of reduction of light for each color component is substantially the same is employed. Therefore, the dynamic range of the signal for each color component can be widened. As a result, detection of various information items from outside the image recording range on the photographic film can be performed accurately.

Since the spectral transmittance characteristic of the optical filter can be approximated to the general spectral transmittance characteristic of the film base of the negative film, the dynamic ranges of signals for respective color components outputted from the photometric means for a plurality of types of negative films can be widened in an average manner regardless of the type of the film.

BRIEF DESCRIPTION OF THE DRAWINGS

FIG. 6 is schematic block diagram showing an example of the structure of a sampling circuit for detecting DX code.

FIG. 7 is a schematic block diagram showing an example of the structure of a sampling circuit for detecting a frame-position.

FIG. 8 is a schematic block diagram showing an example of the structure of an image data sampling circuit for controlling exposure.

FIG. 9 is a block diagram showing the schematic structure of a control unit for a photographic film printer according to a second embodiment of the present invention.

FIG. 10 is a schematic block diagram showing an example of the structure of an image data sampling circuit according to the second embodiment.

FIG. 11 is a conceptual plan view showing the positional relationship among a CCD area sensor, a light reducing filter and a negative film according to another example of the light reducing means.

DETAILED DESCRIPTION OF THE PREFERRED EMBODIMENTS

Embodiments of the present invention will now be described with reference to the drawings. As this invention may be embodied in several forms without departing from the spirit of essential characteristics thereof, the present embodiment is therefore illustrative and not restrictive.

First Embodiment

Figure 1:
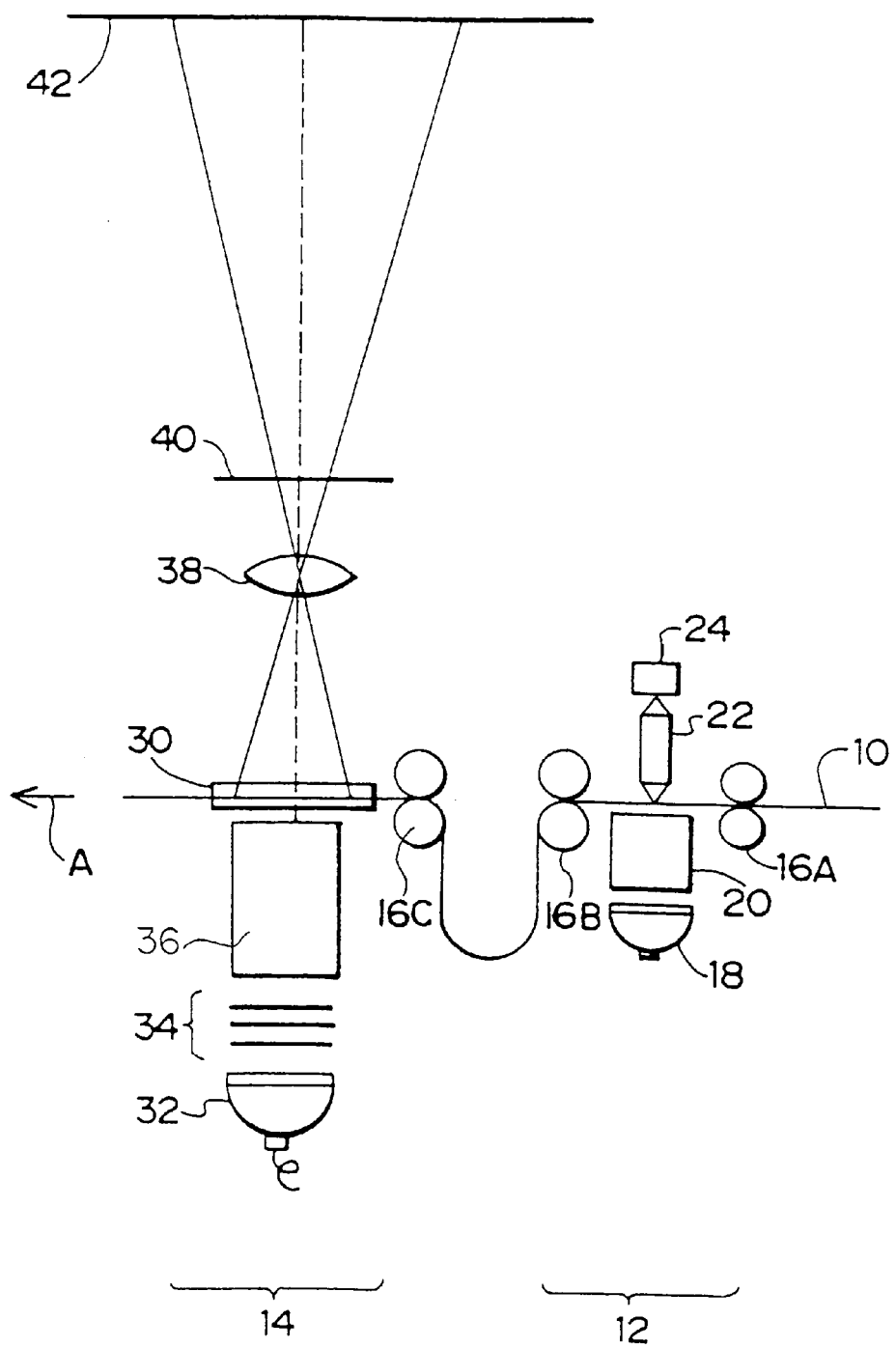
FIG. 1 is a schematic view showing the structure of an optical system of a photographic film printer according to an embodiment of the present invention.

FIG. 1 shows an optical system of a photographic film printer having a film information obtaining apparatus according to the present invention. The optical system of the photographic film printer has a photometric portion 12 and an exposing portion 14 sequentially formed along the moving passage for a negative film 10 which is a photographic film. A plurality of moving roller pairs 16A, 16B and 16C are disposed at intermediate positions of the moving passage for the negative film 10. The negative film 10 is held by the moving roller pairs 16A, 16B and 16C so as to be moved in a direction indicated by an arrow A shown in FIG. 1.

A photometric portion 12 has a light source 18 and a diffusing box 20 disposed below the moving passage for the negative film 10. Thus, a light beam emitted from the light source 18 is diffused and mixed in the diffusing box 20, and then irradiated to the negative film 10. A cylindrical refractivity diffused lens 22 (a so-called "Selfoc" lens which is a trade name) and a CCD line sensor 24 are sequentially disposed opposite to the light source 18 across the negative film 10. The light beam allowed to pass through the negative film 10 is projected and imaged on a light receiving surface of the CCD line sensor 24 by the refractivity diffused lens 22.

The CCD line sensor 24 has a CCD cell array for red light comprising a filter for permitting transmission of red light disposed on the incidental side, a CCD cell array for green light comprising a filter for permitting transmission of green light disposed on the incidental side and a CCD cell array for blue comprising a filter for permitting transmission of blue light disposed on the incidental side, the CCD cell arrays being disposed in parallel with each other and separated from each other by predetermined distances (each corresponding to a plurality of pixels). The direction of the disposed CCD cell arrays for the respective colors is made to be the widthwise direction of the negative film 10. Also, a plurality of refractivity diffused lenses 22 are disposed in the widthwise direction of the negative film 10.

Figure 2:
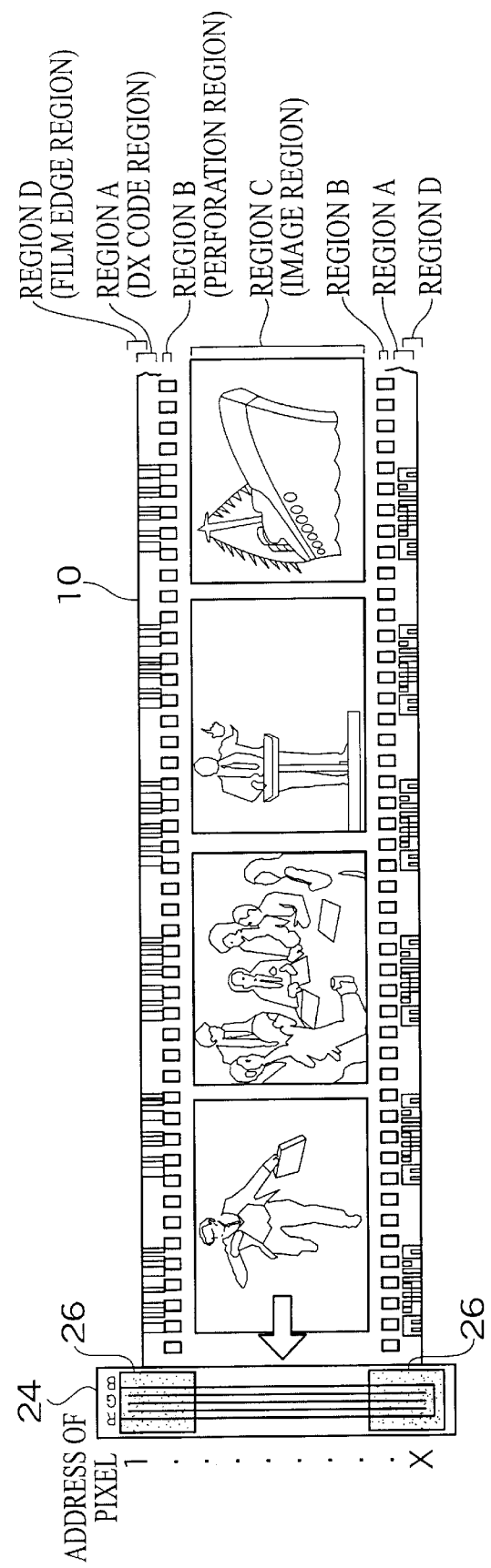
FIG. 2 is a conceptual plan view showing the positional relationship between a negative film and a CCD line sensor and the regions in which each of sampling circuits samples photometric data.

Also as shown in FIG. 2, the length of the range on the negative film 10 in the widthwise direction thereof in which light can be received by each CCD cell array of the CCD line sensor 24 is somewhat longer (by, for example, several millimeters at the two widthwise directional ends of the negative film 10) than the width of the film itself. Therefore, light beams emitted from the diffusing box 20 and allowed to pass through the widthwise directional outside portion of the negative film 10 are made incident on each CCD cell array.

Therefore, by one photometric operation performed by the CCD line sensor 24, the light beam allowed to pass through three imaginary lines disposed in the lengthwise direction of the negative film 10 separated from each other by a predetermined distance and each traversing the negative film 10 in the widthwise direction is decomposed into any one of a red, green or a blue component, and then metered by each CCD cell array. The negative film 10 is moved by the moving rollers 16A to perform the sub-scanning operation. The above-mentioned photometric process is repeated so that the overall surface of the negative film 10 is divided into a multiplicity of pixels and decomposed into red, green and blue light components so as to be metered.

Note that the CCD line sensor 24 according to this embodiment is a CCD line sensor of a type that the size of each pixel on the negative film is 8 $\mu$m×8 $\mu$m, the number of effective pixels is 5363 pixels/color (a predetermined number of CCD cells disposed at ends of each CCD cell array are optical black dummy pixels because their light incidental side are shielded and the total number of pixels including the dummy pixels is 5438 pixels/color) and the distance between the CCD cell arrays corresponds to 8 lines.

The light receiving surface of the CCD line sensor 24 has light reducing filters 26 respectively disposed at ends of the negative film 10, which ends corresponding to the area on which light beams passed through the portions outside the image region of the negative film 10 are made incident (as indicated with half-tone dot portions in FIG. 2). The light reducing filter 26 has a spectral transmittance characteristic (transmittance of blue light Tb ≦ transmittance of green light Tg ≦ transmittance of red light Tr) approximating that of the film base of the negative film 10. Therefore, a light beam allowed to pass through a portion outside the image region of the negative film 10 and a light beam allowed to pass through the widthwise directional outside portion of the negative film 10 are reduced by the light reducing filter 26 and then made incident upon the CCD line sensor 24.

As described later, a time period for which charges are accumulated in the CCD line sensor 24 is determined in such a way that an initial value is employed when metering of the negative film 10 is started and is reset to a period that corresponds to the density of the film base of the negative film 10 which is different among the types of films after the type of then negative film 10 has been detected. If the maximum period is employed among the charge accumulating time periods corresponding to the various types of films, the quantity of light arranged to be reduced by the light reducing filter 26 is determined in such a manner that the quantity of charges accumulated in the CCD cells, on which light beams allowed to pass through the perforation or notch of the negative film 10 or light beams allowed to pass through the widthwise direction outside portion of the negative film 10 are made incident, substantially coincides with the maximum value of the quantity of charge which can be accumulated in the CCD cells. Moreover, the foregoing quantity of charges does not cause saturation of the accumulated charges to take place.

On the other hand, an exposing portion 14 is disposed in the downstream portion of the photometric portion 12 in the direction in which the negative film 10 is moved. A loop of the negative film 10 is formed between the photometric portion 12 and the exposing portion 14 by the moving roller pairs 16B and 16C. The negative film 10 passed through the photometric portion 12 is allowed to pass through the foregoing loop, and then introduced into the exposing portion 14.

The exposing portion 14 has a negative mask 30 disposed on the passage on which the negative film 10 is moved. A light source 32 is disposed below the negative mask 30. A color correcting filter 34 composed of three, C (cyan), M (magenta) and Y (yellow) filters which are capable of independently moving forwards and rearwards to and from the exposing optical path and a diffusing box 36 for diffusing and mixing light beams allowed to pass through the color correcting filter 34 are sequentially disposed adjacent to the light exposing surface of the light source 32. A light beam emitted from the light source 32 is irradiated to the negative film 10 through the color correcting filter 34 and the diffusing box 36.

An exposing lens 38 and a black shutter 40 are, along the exposing optical path, sequentially disposed above the negative mask 30. A passage through which photographic paper 42 is moved is formed above the black shutter 40. A light beam allowed to pass through the negative film 10 is irradiated to the photographic paper 42 through the exposing lens 38 and the black shutter 40.

Figure 3:
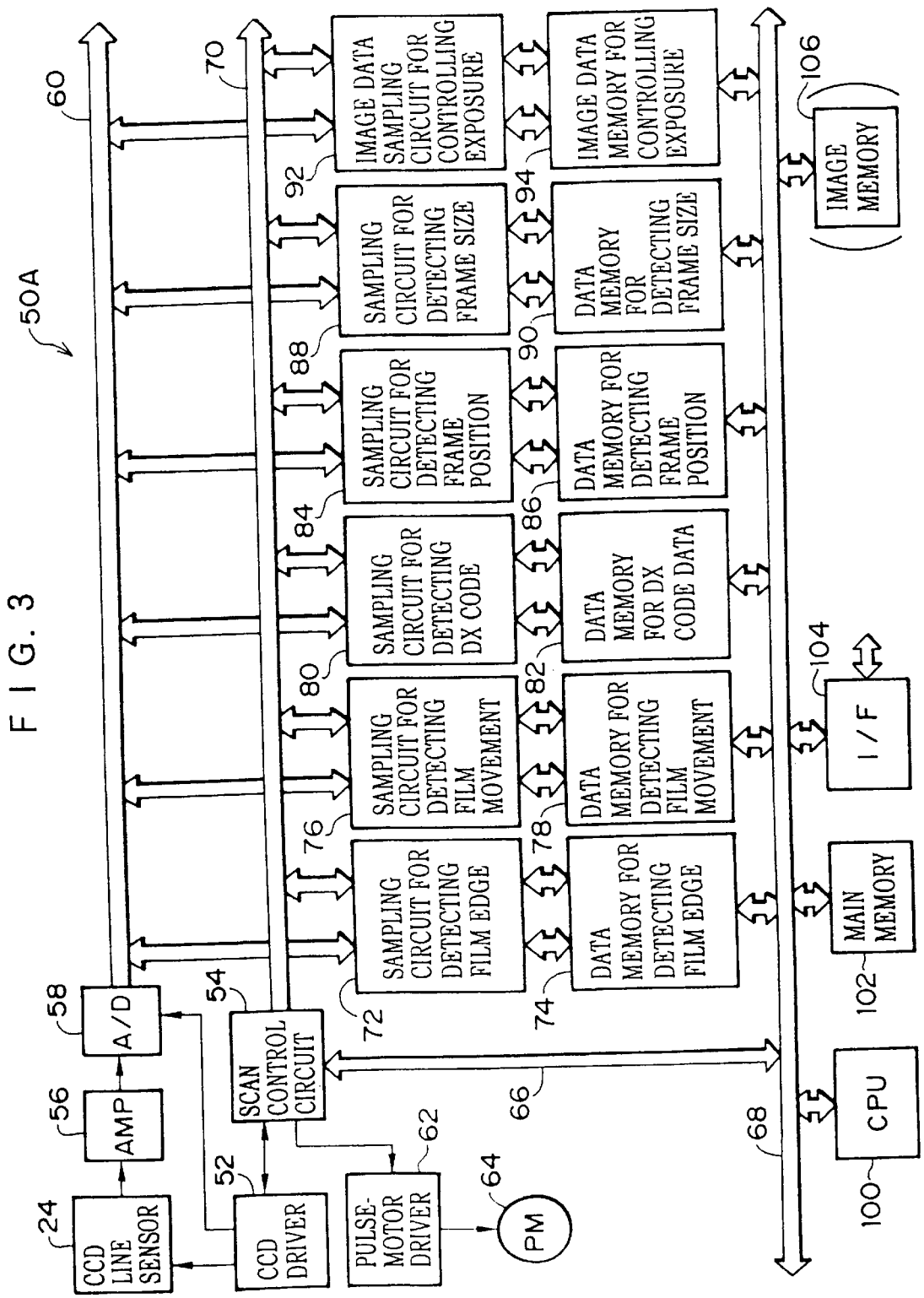
FIG. 3 is a block diagram showing the schematic structure of a control unit for a photographic film printer according to a first embodiment of the present invention.

Referring to FIG. 3, the structure of a control unit 50A of the photographic film printer according to the first embodiment will now be described. The control unit 50A has a CCD driver 52 and a scan control circuit 54. A terminal of the CCD line sensor 24 for receiving a control signal is connected to a CCD driver 52. The CCD driver 52 is connected to a scan control circuit 54. The CCD driver 52 receives from the scan control circuit 54 a photometric operation starting signal indicating the timing of the start of the photometric operation. In response to the foregoing signal, the CCD driver 52 generates a timing signal for activating the CCD line sensor 24.

The timing signal is supplied to the CCD line sensor 24. The CCD line sensor 24 performs the photometric operation (photoelectric conversion process and accumulation of charges) and outputs a signal (transference of the accumulated charges) at the timing which synchronizes with the supplied timing signal. As a result, a signal (an analog photometric signal) indicating a result of decomposition of each of three lines into any one of red, green or blue components from the CCD line sensor 24 is sequentially (in a direction from a pixel having address "1" toward a pixel having address "X" shown in FIG. 2) outputted from the pixel at an end of each line.

The CCD driver 52 is supplied with an accumulation-period instruction signal for indicating the time period during which charges are accumulated in the CCD line sensor 24 from the scan control circuit 54. The CCD line sensor 24 has an electronic shutter (not shown) disposed at a light incidental end of each CCD cell array. The CCD driver 52 follows the supplied accumulation period instruction signal to control the operation of the electronic shutters in such a manner that the charge accumulation period of the CCD line sensor 24 coincides with the accumulating time instructed with the above-mentioned instruction signal.

In this embodiment, the charge accumulating period of the CCD line sensor 24 is determined in such a manner that the charges which are accumulated in the CCD cell, which has received a light beam allowed to pass through a density through portion in the image region (region C shown in FIG. 2) of the negative film 10 having the density which coincides with the density of the film base, substantially coincides with the maximum value of the charges, which can be accumulated in each CCD cell and thus no saturation takes place, if the density through portion exists. As a result, the image region on the negative film 10 is metered with a high dynamic range by the CCD line sensor 24. A light beam allowed to pass through a portion outside the image region of the negative film 10 and a light beam allowed to pass through a portion outside the negative film 10 in the widthwise direction are reduced by the light reducing filter 26, and then made incident upon the CCD line sensor 24. Therefore, the foregoing light beams do not saturate the output from the CCD line sensor 24.

A signal output terminal of the CCD line sensor 24 is, through an amplifier 56, connected to an analog-to-digital converter (an A/D converter) 58. The amplifier 56 has three amplifying circuits corresponding respectively to photometric signals in red, green and blue outputted from the CCD line sensor 24. Each amplifying circuit converts the level of the analog photometric signal in each color supplied from the CCD line sensor 24 to be optimal when the photometric signal is supplied to the A/D converter 58. The amplifier 56 comprises a variety of correction circuits, such as an optical black level correction circuit and a correlation double sampling circuit. Thus, various correcting operations are performed by the correction circuits.

The A/D converter 58 has a control-signal input terminal connected to the CCD driver 52 and a data output terminal connected to a data bus 60 for photometric data. In response to the photometric operation starting signal supplied from the scan control circuit 54, the CCD driver 52 generates a timing signal for the A/D conversion operation and outputs the signal to the A/D converter 58. The A/D converter 58 converts the red, green and blue analog photometric signals, whose levels have been converted in the amplifier 56, into digital data (photometric data) having a predetermined number of bits (for example, 12 bits) at the timing synchronized with the supplied timing signal so as to output photometric data to the data bus 60.

If the number of bits of photometric data outputted from the A/D converter 58 is 12, the data bus 60 is required to be structured such that the data bus 60 simultaneously outputs 36 (=12 bits×three colors) bit data. The CCD line sensor 24, the amplifier 56 and the A/D converter 58 correspond to a photometric means in the present invention.

A pulse motor driver 62 is connected to the scan control circuit 54. A pulse motor 64, whose drive shaft is connected by way of a driving force transmission mechanism to the moving rollers 16A, is connected to the pulse motor driver 62. The pulse motor driver 62 rotates the pulse motor 64 to move the negative film 10 in accordance with a control signal supplied from the scan control circuit 54.

The scan control circuit 54 is connected to a CPU 100 (described later) through a scan controlling bus 66 comprising a data bus, an address bus and a control bus and a CPU bus 68 comprising a data bus, an address bus and a control bus. The scan control circuit 54 receives various parameters and control commands for scanning and metering the negative film 10 from the CPU 100 through the buses 66 and 68. In accordance with the supplied parameters and control commands, the scan control circuit 54 outputs the photometric operation starting signal and the accumulation period instruction signal to the CCD driver 52. Moreover, the scan control circuit 54 controls the operation of the pulse motor 64 through the pulse motor driver 62 in such a manner that the negative film 10 is moved at the timing synchronized with the timing of the photometric operation.

An output terminal of the scan control circuit 54 is connected to an address/control bus 70 for photometric data. The scan control circuit 54 outputs, to the address/control bus 70, the address (the line address) of the pixel corresponding to the photometric data outputted from the A/D converter 58 at the timing synchronized with the timing of the output of the photometric data from the A/D converter 58. Moreover, the scan control circuit 54 outputs, to the address/control bus 70, a signal indicating an effective timing (sampling timing) of photometric data outputted from the A/D converter 58 to the data bus 60. The scan control circuit 54 responds to the CPU 100, if necessary.

A sampling circuit for detecting film edge 72 (which is hereinafter referred to as a film-edge detecting sampling circuit 72 just for convenience) is connected to the data bus 60 and the address/control bus 70. A data memory for detecting film edge 74 (which is hereinafter referred to as a film-edge detecting data memory 74 for convenience' sake) comprising an FIFO (First-In-First-Out) memory is connected to the film-edge detecting sampling circuit 72. The film-edge detecting data memory 74 is connected to the CPU bus 68. The film-edge detecting sampling circuit 72 corresponds to an extracting means of the present invention and also corresponds to processing means. Therefore, the film-edge detecting sampling circuit 72 extracts, from photometric data sequentially outputted from the A/D converter 58 to the data bus 60, only the photometric data required to detect the position of the widthwise directional edge of the negative film 10 and obtains data for detecting the film edge in accordance with the extracted photometric data so as to store the obtained data in the film-edge detecting data memory 74 which is a storage means of the present invention.

The film-edge detecting sampling circuit 72 sequentially samples, from the photometric data sequentially outputted from the A/D converter 58 to the data bus 60, only photometric data of a specific color component (for example, blue) corresponding to the result of a photometric operation of region D (a region in which the film edge exists) shown in FIG. 2. Then, the film-edge detecting sampling circuit 72 repeats calculations of the difference between the photometric data sampled previously and the photometric data currently sampled in the direction of the widthwise direction of the negative film 10. When the difference in the photometric data (the difference in the photometric value) is larger than a threshold value determined for detecting the edge of the film, the film-edge detecting sampling circuit 72 stores the line address supplied through the address/control bus 70 in the film-edge detecting data memory 74 as the data for detecting film-edge.

Figure 4:
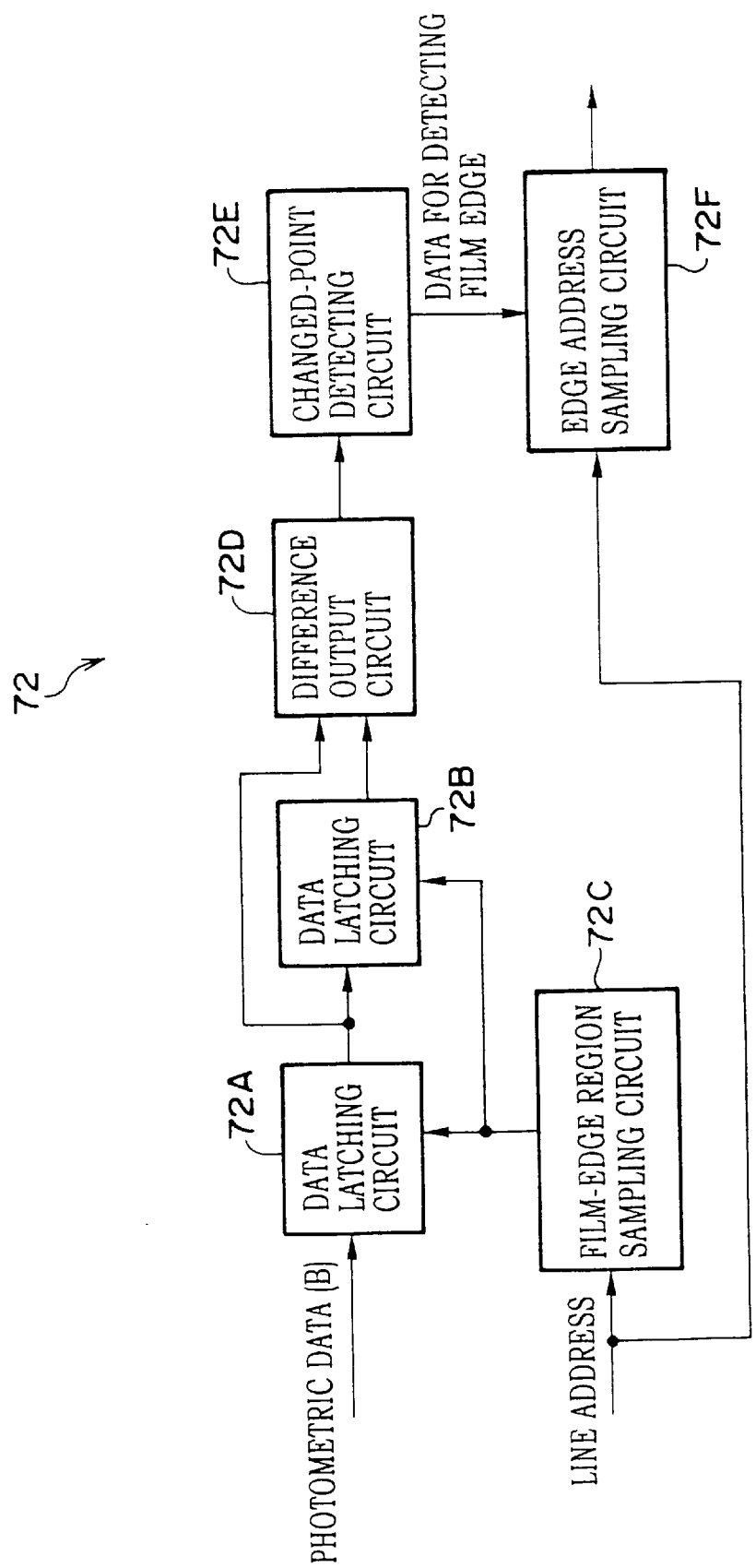
FIG. 4 is a schematic block diagram showing an example of the structure of a film-edge detecting sampling circuit.

Specifically, the film-edge detecting sampling circuit 72 may be structured as shown in FIG.4. That is, the film-edge detecting sampling circuit 72 shown in FIG. 4 comprises a data latching circuit 72A, a film-edge-region sampling circuit 72C and an edge address sampling circuit 72F. An input terminal of the data latching circuit 72A is connected only to the data bus for transferring photometric data in blue among the data bus 60 so that the photometric data in blue is sequentially supplied to the data latching circuit 72A. An output terminal of the data latching circuit 72A is connected to an input terminal of the data latching circuit 72B, while the output terminals of the data latching circuits 72A and 72B respectively are connected to the input terminal of a difference output circuit 72D.

Input terminals of the film-edge-region sampling circuit 72C and the edge address sampling circuit 72F are connected to the address/control bus 70. An output terminal of the film-edge-region sampling circuit 72C is connected to the data latching circuits 72A and 72B. When the address (line address) of the pixel corresponding to the photometric data supplied to the data latching circuit 72A is an address corresponding to a region (region D shown in FIG. 2: the film-edge region) in which the edge of the film exists, and also the timing is the data effective timing, the film-edge-region sampling circuit 72C outputs a signal instructing a latching of the photometric data to the data latching circuits 72A and 72B. Therefore, the data latching circuit 72A sequentially latches photometric data of the pixels in the film edge region, while the data latching circuit 72B latches the photometric data previously latched in the data latching circuit 72A.

The difference output circuit 72D sequentially calculates the difference between the photometric data latched by the data latching circuit 72A and the photometric data latched by the data latching circuit 72B (that is, the photometric data previously latched by the data latching 72A) in order to output the result of the calculation to a changed-point detecting circuit 72E. The changed-point detecting circuit 72E subjects the difference supplied from the difference output circuit 72D and the predetermined threshold value to a comparison. If the difference is larger than a predetermined threshold value for detecting the edge, the changed-point detecting circuit 72E outputs a detection signal to the edge address sampling circuit 72F. When the detection signal has been supplied to the edge address sampling circuit 72F, the edge address sampling circuit 72F latches the address from the address/control bus 70, and then outputs the latched address (indicating the position of the edge of the film) to the film-edge detecting data memory 74 as data for detecting the film edge.

A sampling circuit for detecting film movement 76 (which is hereinafter referred to as a film movement detecting sampling circuit 76 for convenience' sake) is connected to the data bus 60 and the address/control bus 70, and to the film movement detecting sampling circuit 76, a data memory for detecting film movement 78 (which is hereinafter referred to as a film movement detecting data memory 78 just for convenience) comprising an FIFO memory is connected. The film movement detecting data memory 78 is connected to the CPU bus 68. The film movement detecting sampling circuit 76 corresponds to the extracting means of the present invention and also corresponds to the processing means, and sequentially samples only photometric data corresponding to the result of metering region B (perforation region) shown in FIG. 2 in a specific color (for example, blue) among the data sequentially outputted from the A/D converter 58 to the data bus 60. The film movement detecting sampling circuit 76 compares the photometric value indicated by the sampled photometric data and a predetermined threshold value set for detecting whether or not a perforation exist, and stores binary data (data indicating whether or not a perforation exists) indicating the result of the comparison to the film movement detecting data memory 78 as the data for detecting the film movement.

Figure 5:
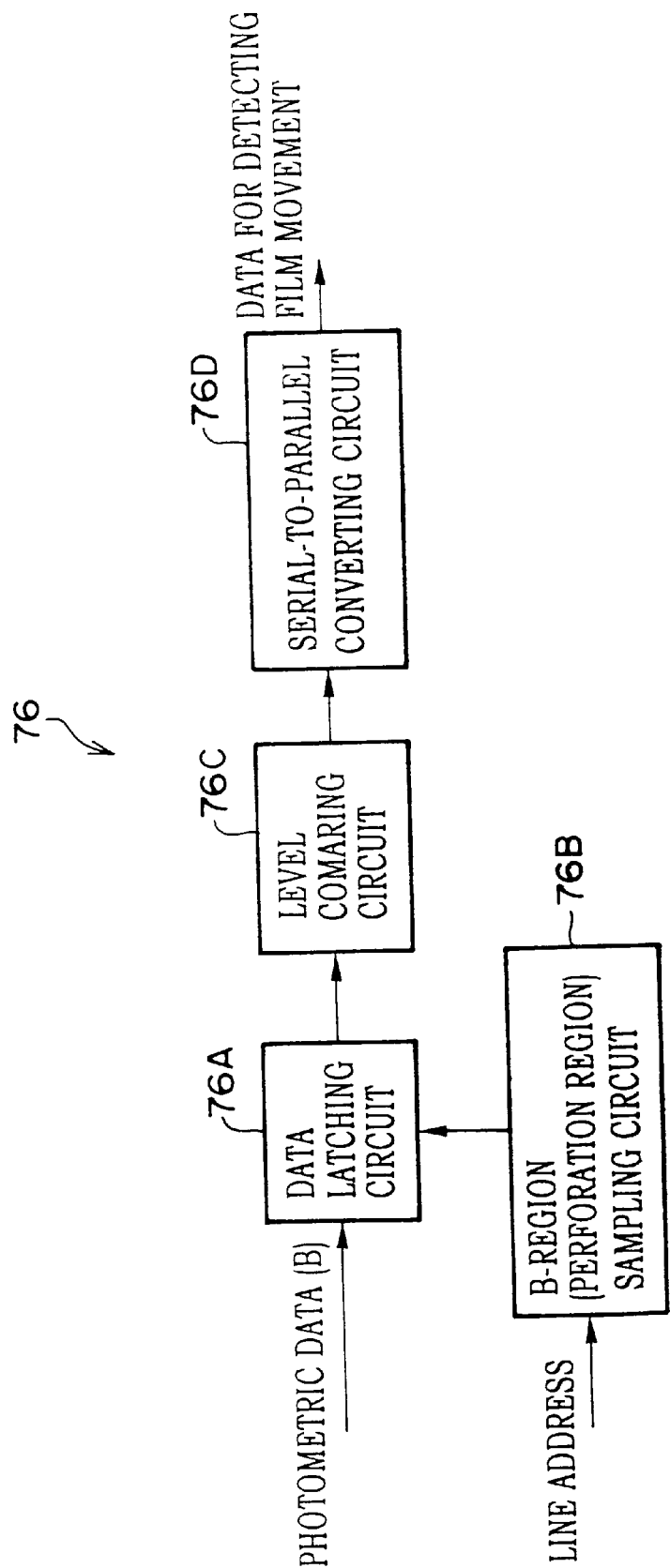
FIG. 5 is a schematic block diagram showing an example of the structure of a sampling circuit for detecting film movement.

Specifically, the film movement detecting sampling circuit 76 may be structured as shown in FIG. 5. That is, the film movement detecting sampling circuit 76 shown in FIG. 5 has a data latching circuit 76A and a B-region (the perforation region) sampling circuit 76B. An input terminal of the data latching circuit 76A is connected only to a data bus for transferring photometric data of blue component among the data bus 60. Thus, the photometric data of blue component is sequentially supplied to the data latching circuit 76A. An output terminal of the data latching 76A is connected to an input terminal of the level comparison circuit 76C.

An input terminal of the B-region sampling circuit 76B is connected to the address/control bus 70. An output terminal of the B-region sampling circuit 76B is connected to the data latching circuit 76A. When the address (the line address) of the pixel corresponding to the photometric data supplied to the data latching circuit 76A is an address corresponding to a region (region B shown in FIG. 2: perforation region) of the negative film 10 in which a perforation exists and the timing is a data effective timing, the B-region sampling circuit 76B outputs a signal for instructing the latching of the photometric data to the data latching circuit 76A. Therefore the data latching circuit 76A sequentially latches the photometric data of pixels in the perforated region.

The level comparison circuit 76C compares the photometric data latched by the data latching circuit 76A and a predetermined threshold value for detecting whether or not a perforation exists, and outputs binary data "0" or "1" in accordance with the result of the comparison to a serial-to-parallel converting circuit 76D. The serial-to-parallel converting circuit 76D converts the supplied binary data into parallel data having a predetermined number of bits (for example, 8 bits) and outputs the parallel data above to the film movement detecting data memory 78 as the data (data indicating whether or not a perforation exists) for detecting the film movement.

A sampling circuit for detecting DX-code 80 (which is hereinafter referred to as a DX-code detecting sampling circuit 80 for convenience) is connected to the data bus 60 and the address/control bus 70. A data memory for detecting DX-code data 82 (which is hereinafter referred to as a DX-code detecting data memory 82) comprising an FIFO memory is connected to the DX-code detecting sampling circuit 80. The DX-code data memory 82 is connected to the CPU bus 68. The DX-code detecting sampling circuit 80 corresponds to the extracting means of the present invention and also to the processing means claimed. Red, green and blue photometric data sequentially outputted from the A/D converter 58 to the data bus 60 are formed in such a way that pixels corresponding to photometric data have the same line address and shifted in the sub-scanning direction by plural pixels. The DX-code detecting sampling circuit 80 causes red, green and blue photometric data items of the same pixel to simultaneously be inputted by delaying input of photometric data in two colors (for example, green and blue)

among red, green and blue photometric data items. Moreover, the DX-code detecting sampling circuit 80 sequentially samples only red, green and blue photometric data corresponding to region A (a DX code region) shown in FIG. 2 among red, green and blue photometric data items which are sequentially supplied. Then, the DX-code detecting sampling circuit 80 stores density data obtained by adding the thus sampled red, green and blue photometric data items to one another in the DX code data memory 82 as DX code data.

The DX-code detecting sampling circuit 80 may be structured as shown in FIG. 6. That is, the DX-code detecting sampling circuit 80 shown in FIG. 6 comprises an adder circuit 80A having three input terminals and an A-region sampling circuit 80B. A data bus among the data bus 60 for transferring photometric data of red component is directly connected to an input terminal of the adder circuit 80A, a data bus for transferring photometric data of green component is, through a delay circuit 80c, connected to an input terminal of the adder circuit 80A and a data bus for transferring photometric data of blue component is, through a delay circuit 80D, connected to an input terminal of the adder circuit 80A.

The delay circuit 80C delays supplied photometric data in green by a degree corresponding to the interval between the red CCD cell array and a green CCD cell array of the CCD line sensor 24 in the sub-scanning direction, and then outputs the supplied green photometric data. The delay circuit 80D delays supplied photometric data in blue by a degree corresponding to the interval between the red CCD cell array and a blue CCD cell array of the CCD line sensor 24 in the sub-scanning direction, and then outputs the supplied blue photometric data. As a result, red, green and blue photometric data items of the same pixel are simultaneously supplied to the adder circuit 80A.

An input terminal of the A-region sampling circuit 80B is connected to the address/control bus 70. An output terminal of the A-region sampling circuit 80B is connected to the adder circuit 80A. When the address (the line address) of the pixel corresponding to red, green and blue photometric data supplied to the adder circuit 80A is an address corresponding to the region (region A shown in FIG. 2: DX code region) in which the DX code of the negative film 10 has been recorded and the timing is data effective timing, the A-region sampling circuit 80B outputs a signal instructing the addition of the photometric data to the adder circuit 80A. When the adder circuit 80A is supplied with the signal instructing the addition, the adder circuit adds red, green and blue photometric data of the same pixel, and then outputs the result of the addition to the DX code data memory 82 as the DX code density data.

A sampling circuit for detecting frame-position 84 (which is hereinafter referred to as a frame-position detecting sampling circuit 84) is connected to the data bus 60 and the address/control bus 70. A data memory for detecting frame-position 86 (which is hereinafter referred to as a frame-position detecting data memory 86) comprising an FIFO memory is connected to the frame-position detecting sampling circuit 84. The frame-position detecting data memory 86 is connected to the CPU bus 68. The frame-position detecting sampling circuit 84 corresponds to the extracting means of the present invention and also to the processing means. Similarly to the DX-code detecting sampling circuit 80, the frame-position detecting sampling circuit 84 causes red, green and blue photometric data of the same pixel to be inputted simultaneously by delaying input of photometric data in two colors (for example, green and blue) among red, green and blue photometric data, and then sequentially samples only red, green and blue photometric data of the pixels corresponding to region C (the image region) shown in FIG. 2 among red, green and blue photometric data of the same pixel which are sequentially supplied.

The frame-position detecting sampling circuit 84 adds sampled red, green and blue photometric data to one another to obtain density data. Then, the frame-position detecting sampling circuit 84 performs summation (integration) of the density data items for a predetermined number of pixels corresponding to the number of pixels in each region when a portion of one line positioned in the region C into a plurality of linear regions. Then, the frame-position detecting sampling circuit 84 stores the result of summation of the density data (corresponding to an average density of each of a plurality of frame position detecting regions) in the frame-position detecting data memory 86 as the frame position detecting data.

Specifically, the frame-position detecting sampling circuit 84 may be structured as shown in FIG. 7. That is, the frame-position detecting sampling circuit 84 shown in FIG. 7 comprises an adder circuit 84A having three input terminals and a C-region sampling circuit 84B. A data bus of the data bus 60 for transferring photometric data of red component is directly connected to an input terminal of the adder circuit 84A. A data bus for transferring photometric data of green component is, through a delay circuit 84C, connected to an input terminal of the adder circuit 84A. A data bus for transferring photometric data of blue component is, through a delay circuit 84D, connected to an input terminal of the adder circuit 84A.

The quantity of delay realized by the delay circuit 84C and the delay circuit 84D are made to be substantially the same as the quantity of delay realized by the foregoing delay circuit 80C and the delay circuit 80D of the DX-code detecting sampling circuit 80. Thus, photometric data items in red, green and blue of the same pixel are simultaneously supplied to the adder circuit 84A.

An input terminal of the C-region sampling circuit 84B is connected to the address/control bus 70. An output terminal of the C-region sampling circuit 84B is connected to the adder circuit 84A. When the address (the line address) of the pixel corresponding to red, green and blue photometric data supplied to the adder circuit 84A is an address corresponding to an image region (the region C shown in FIG. 2) of the negative film 10 and the timing is data effective timing, then the C-region sampling circuit 84B outputs a signal instructing the addition of photometric data to the adder circuit 84A. When the adder circuit 84A is supplied with the addition instructing signal, the adder circuit 84A adds the supplied red, green and blue photometric data of the same pixel, and then outputs the result of the addition to a pixel integrating circuit 84E as the density data.

The pixel integrating circuit 84E performs a summation (integration) of the density data items sequentially outputted from the adder circuit 84A for a predetermined number of pixels corresponding to the number of pixels of each region when a portion of one line positioned in the region C (the image region) is divided into a plurality of (for example, 16) linear regions (the region for detecting the position of the frame). As a result, the pixel integrating circuit 84E sequentially outputs, to the frame-position detecting data memory 86, density data indicating the average density of each of the plural regions for detecting the position of the frame as the data for detecting the frame position.

A sampling circuit for detecting frame-size 88 (which is hereinafter referred to as a frame-size detecting sampling circuit 88) is connected to the data bus 60 and the address/control bus 70. A data memory for detecting frame-size 90 (which is hereinafter referred to as a frame-size detecting data memory 90) comprising an FIFO memory is connected to the frame-size detecting sampling circuit 88. The frame-size detecting data memory 90 is connected to the CPU bus 68. The frame-size detecting sampling circuit 88 corresponds to the extracting means of the present invention and also to the processing means. The frame-size detecting sampling circuit 88 causes photometric data in red, green and blue of the same pixel to be simultaneously inputted by delaying photometric data in two colors among red, green and blue photometric data. Only when photometric data of the pixels on a predetermined number of lines are inputted and subsequently photometric data of pixels for one line is inputted, then the frame-size detecting sampling circuit 88 sequentially samples the photometric data in red, green and blue of the pixels corresponding to the region C (the image region) shown in FIG. 2.

The frame-size detecting sampling circuit 88 adds sampled photometric data in red, green and blue to obtain density data, and then performs a summation (integration) of the density data for a predetermined number of pixels corresponding to the number of pixels in each region when a portion of one line positioned in the region C is divided into a plurality of linear regions. Then, the frame-size detecting sampling circuit 88 stores the result of the summation (corresponding to an average density of each of the plural regions for detecting the size of the frame) in the frame-size detecting data memory 90 as the data for detecting the frame size.

Specifically, the frame-size detecting sampling circuit 88 may have substantially the same structure as that of the frame-position detecting sampling circuit 84 (see FIG. 7). When photometric data for a plurality of lines (for example, hundreds of lines) are outputted from the A/D converter 58 through the data bus 60 and subsequently photometric data for one line is outputted, and the address (the line address) of the pixel corresponding to the photometric data in red, green and blue which are inputted to the adder circuit is an address corresponding to the image region (the region C shown in FIG. 2) of the negative film 10 and also the timing is data effective timing, then the adder circuit and the pixel integrating circuit of the C-region sampling circuit of the frame-size detecting sampling circuit 88 are operated.

The pixel integrating and calculating circuit 84E of the frame-size detecting sampling circuit 88 performs a summation (integration) of the density data sequentially outputted from the adder circuit for each of a predetermined number of pixels corresponding to each region when a portion of one line positioned in the region C (the image region) is divided into linear regions (the regions for detecting the size of the frame), the number of which is (for example, 64) larger than that employed when the position of the frame is detected. Whenever the A/D converter 58 outputs photometric data for a predetermined number of lines through the data bus 60 and subsequently the A/D converter 58 outputs photometric data for a next line, the pixel integrating and calculating circuit of the frame-size detecting sampling circuit 88 sequentially outputs the density data indicating an average density of each of the plural regions for detecting the size of the frame to the frame-size detecting data memory 90.

An image date sampling circuit for controlling exposure 92 (which is hereinafter referred to as an exposure controlling image data sampling circuit 92) is connected to the data bus 60 and the address/control bus 70. An image data memory for controlling exposure 94 (which is hereinafter referred to as an exposure controlling image data memory 94) comprising a FIFO memory is connected to the exposure controlling image data sampling circuit 92. The exposure controlling image data memory 94 is connected to the CPU bus 68. The exposure controlling image data sampling circuit 92 corresponds to the extracting means of the present invention and also to the processing means. The exposure controlling image data sampling circuit 92 sequentially samples only red, green and blue photometric data of the pixels corresponding to the region C (the image region) shown in FIG. 2 among photometric data sequentially outputted from the A/D converter 58 to the data bus 60. Then, the exposure controlling image data sampling circuit 92 sequentially samples only the photometric data corresponding to the result of the photometric operation and in only a specific color (for example, blue). Then, the exposure controlling image data sampling circuit 92 integrates, for each color, photometric data of a region (for example, a region composed of 12 pixels×12 pixels) composed of a plurality number of pixels in the direction of the line (in the main scanning direction) and the direction (in the sub-scanning direction) in which the film is moved, and stores the thus integrated data in the exposure controlling image data memory 94 as the exposure controlling image data.

The exposure controlling image data sampling circuit 92 may be structured as shown in FIG. 8. That is, the exposure controlling image data sampling circuit 92 shown in FIG. 8 comprises a R(red)-pixel integrating and calculating circuit 92A, a G(green)-pixel integrating and calculating circuit 92B, a B(blue)-pixel integrating and calculating circuit 92C and a C-region sampling circuit 92D. An input terminal (not shown) of the C-region sampling circuit 92D is connected to the address/control bus 70. An output terminal (not shown) of the C-region sampling circuit 92D is connected to the pixel integrating and calculating circuits 92A to 92C. Thus, the C-region sampling circuit 92D instructs the pixel integrating and calculating circuits 92A to 92C to sample photometric data when the address (the line address) of the pixel corresponding to the photometric data supplied to the pixel integrating and calculating circuits 92A to 92C is an address corresponding to the image region (the region C shown in FIG. 2) of the negative film 10 and the timing is data effective timing.

The R-pixel integrating and calculating circuit 92A is connected to a data bus for transferring photometric data in red among the data bus 60. The G-pixel integrating and calculating circuit 92B is connected to a data bus for transferring photometric data in green among the data bus 60. The B-pixel integrating and calculating circuit 92C is connected to a data bus for transferring photometric data in blue among the data bus 60. When the instruction to sample photometric data is made, each of the pixel integrating and calculating circuits 92A to 92C samples photometric data, and then, for each color, integrates the photometric data of a region (for example, a region composed of 12 pixels×12 pixels) composed of a predetermined number of pixels in the direction of the line (in the main scanning direction) and the direction (in the sub-scanning direction) in which the film is moved, and outputs the integrated data to the exposure controlling image data memory 94 as the exposure controlling image data.

As shown in FIG. 3, a CPU 100, a main memory 102, an interface (I/F) circuit 104 are connected to the CPU bus 68. The CPU 100 controls the scanner portion comprising the CCD line sensor 24, the amplifier 56, the A/D converter 58, the CCD driver 52, the pulse motor driver 62, the pulse motor 64 and the scan control circuit 54. Moreover, the CPU 100 totally controls the photographic film printer. The main memory 102 has programs for performing various controls and data stored therein. The I/F circuit 104 establishes the interface with other sensors and drivers of the photographic printer and various external units.

Note that the structure may be formed such that the CPU 100 controls only the scanner portion. In this case, a main control CPU for totally controlling the photographic film printer is provided individually from the CPU 100 and the CPU 100 performs communication with the main control CPU through the I/F circuit 104. The control unit 50A may be additionally provided with an image memory 106 having a large capacity which is capable of storing image data in a large quantity. The additionally provided image memory 106 is connected to the CPU bus 68.

The operation of the first embodiment will now be described. When the negative film 10 is loaded in the photographic film printer, the CPU 100 turns on the light source 18 of the photometric portion 12. Moreover, the CPU 100 sets parameters for determining various timing to the scan control circuit 54 through the buses 66 and 68. Then, the CPU 100 outputs a command to operate the scan control circuit 54.

As a result, the scan control circuit 54 outputs, to the CCD driver 52, the photometric operation starting signal. Thus, the CCD driver 52 generates a timing signal for operating the CCD and a timing signal for A/D conversion to output the A/D converting timing signal to the A/D converter 58 and outputs the timing signal for driving the CCD to the CCD line sensor 24 and the scan control circuit 54. The scan control circuit 54 controls the rotations of the pulse motor 64 through the pulse motor driver 62 to enable the negative film 10 to be moved at the timing synchronized with the timing signal supplied from the CCD driver 52.

When a light beam transmitted from the photometric region has been made incident upon the light receiving surface of the CCD line sensor 24, each CCD cell of the CCD cell array for red, green and blue component of the CCD line sensor 24 accumulates charges generated by the incidental light beam. After predetermined charge accumulating period has elapsed, the charges accumulated in each CCD cell are sequentially outputted for each of red, green and blue component as independent photometric signals at the timing synchronized with the transference clock signal. In synchronization with the photometric operation, the negative film 10 is moved. Thus, the overall surface of the negative film 10 is divided into a plurality of pixels, and decomposed for red, green and blue components so as to be metered by the CCD line sensor 24.

In this embodiment, a predetermined number of (for example, 63) CCD cells at the ends of each CCD cell array of the CCD line sensor 24 are dummy pixels (dummy cells) which are shielded to prevent incidence of external light. The dummy cells output invalid signals each indicating an optical black level. Therefore, a photometric signal is outputted from the CCD line sensor 24 in such a way that the invalid signals corresponding to a predetermined number of dummy pixels are outputted and then signals corresponding to effective pixels are outputted. The invalid signal may be used in a correcting operation in which the level of the optical black level is subtracted from the level of the signal corresponding to the effective pixel, that is, in an operation of correcting the output in a dark state.

As a result of the photometric operation, the CCD line sensor 24 sequentially outputs red, green and blue photometric signals for each pixel. The level of the photometric signal outputted from the CCD line sensor 24 is converted by the amplifier 56, and then converted into photometric data by the A/D converter 58 so as to sequentially be outputted to the data bus 60. In response to the timing signal supplied from the CCD driver 52, the scan control circuit 54 sequentially determines the line address of the pixel corresponding to the photometric data sequentially outputted from the A/D converter 58, and then outputs the determined line address to the address/control bus 70.

On the other hand, each of the film-edge detecting sampling circuit 72, the film movement detecting sampling circuit 76, the DX-code detecting sampling circuit 80, the frame-position detecting sampling circuit 84, the frame-size detecting sampling circuit 88 and the exposure controlling image data sampling circuit 92 determines the photometric region of the CCD line sensor 24 which has been outputted from the A/D converter 58 in accordance with the line address supplied through the address/control bus 70, and then samples (extracts) only photometric data of the region, which must be extracted, from the data bus 60 during the data effective timing.

Sampled photometric data is processed into data (hereinafter called as generic name "optical information", which are, specifically, data for detecting the edge of the film, data for detecting movement of the film, DX code data, frame position detecting data, frame size detecting data or exposure controlling image data) in a predetermined data format so as to be stored in the corresponding data memory (the film-edge detecting data memory 74, film movement detecting data memory 78, the DX code data memory 82, the frame-position detecting data memory 86, the frame-size detecting data memory 90 or the exposure controlling image data memory 94).

The above-mentioned process is performed in each sampling circuit in parallel to the output of the photometric data from the A/D converter 58 so that various optical information items are sequentially stored in each of the data memories. Therefore, the necessity of performing a complicated process can be eliminated in which photometric data outputted from the A/D converter 58 is temporarily stored in an image memory or the like and optical information corresponding to information which must be detected or obtained is determined among the photometric data stored in the image memory to extract only the determined optical information from the image memory. Therefore, optical information, which must be obtained, can be obtained in a short time.

On the other hand, the CPU 100 performs various processes in accordance with the optical information stored in each data memory. The following processes among the processes which are performed by the CPU 100 are processes corresponding to the second processing means and first processing means.

The CPU 100 extracts the DX code stored in the DX code data memory 82 to analyze the contents of the DX code in accordance with the change of density in the DX code region (the region A) in the lengthwise direction of the negative film 10 indicated with the extracted DX code data. In this embodiment, the DX-code detecting sampling circuit 80 samples photometric data corresponding to the DX code regions at the two widthwise direction ends of the negative film 10 to obtain DX code data from the sampled photometric data and stores the obtained DX code data in the DX code data memory 82. Therefore, the CPU 100 analyzes the contents of the DX codes recorded on the two widthwise directional ends of the negative film 10 to detect the type of the negative film 10. Since DX code data is in the form of a data format with which the DX code can easily be analyzed as compared with photometric data, analysis of the contents of the DX code and detection of the type of the film can be completed in a short time.

The characteristics of the negative film, such as a change in the developed color density for each color component with respect to a change in the quantity of exposure, varies among the types of the films. Therefore, the detected type of the film is used in a calculation (to be described later) for obtaining the exposing condition which is required when exposure of the image to the photographic paper 42 is performed in the exposing portion 14. Since also the density of the film base of the negative film is different among the types of the films, a structure may be employed in which the density of the film base for each type is previously stored in the main memory 102 and the charge accumulating period of the CCD line sensor 24 is changed to be adaptable to the density of the film base of the detected type of the negative film 10. A structure may be employed in which the density of the film base corresponding to the detected type of the film is extracted to re-determine the charge accumulating period of the CCD line sensor 24 in such a manner that the quantity of charges accumulated in the CCD cell (the CCD cell for receiving a light beam supplied from a through portion) corresponding to a density through portion in the image region in which the density substantially coincides with the extracted density of the film base substantially coincides with the maximum value of charges which can be accumulated in the CCD cell, thereby to prevent saturation of the accumulated charges.

The above-mentioned process corresponds to the photometric condition adjusting means of the present invention. As a result of the operation for re-determining the charge accumulating period, the charge accumulating period is made to be longer than the initial value. Thus, the CCD cells corresponding to the image region are able to accurately meter the image region with a wide dynamic range without occurrence of saturation of accumulated charges (saturation of the level of the photometric signal outputs from the CCD line sensor 24). Therefore, the number of gradients of the image which is expressed with the image data for controlling exposure stored in the exposure controlling image data memory 94 can be enlarged. In addition, accuracy of detection of the position of the image frame and that of detection (to be described later) of the size of the image frame using photometric data of the image region (the region C) can be improved.

Light beams respectively allowed to pass through the portion outside the image region, in which the perforations or notches are formed, or those allowed to pass through the outside in the entire widthwise direction of the negative film 10 are white beams. However, the light reducing filter 26 has the spectral transmittance characteristic approximating the spectral transmittance characteristic of the film base of the negative film 10. Moreover, the CCD line sensor 24 and the amplifier 56 are adjusted in such a manner that the outputs of red, green and blue signals are substantially the same when a light beam allowed to pass through the through portion is made incident. When the shortest time among charge storage time periods corresponding to the various film types is selected, the quantity of reduction realized by the light reducing filter 26 is determined in such a manner that the quantity of charges accumulated in the CCD cells on which the light beams allowed to pass through the perforation or the notch formed in the negative film 10 or the light beams allowed to pass through the widthwise directional outside of the negative film 10 are made incident substantially coincides with the maximum quantity of charges which can be accumulated in the CCD cell and saturation of the accumulated charges can be prevented.

Therefore, even if the charge accumulating period is extended, saturation of accumulated charges in the CCD cell on which a light beam allowed to pass through the portion of the perforation or the notch of the negative film 10 is made incident and a CCD cell on which a light beam allowed to pass through the outside in the widthwise direction of the negative film 10 is made incident can be prevented (same for each of the CCD cells for red, green and blue components). Moreover, the CCD cells corresponding to the outside of the image region are able to meter the outside the image region with a wider dynamic range and excellent accuracy. Therefore, the accuracy of detecting the position of the film edge and detecting the state of film movement by using the photometric data outside the image region can be improved.

The characteristics of the negative film, such as a change in the developed color density for each color component with respect to a change in the quantity of exposure, varies among the types of the films. Therefore, the type of the film detected by analyzing the contents of the DX code is used in a calculation (to be described later) for obtaining the exposing condition which is required when exposure of the image to the photographic paper 42 is performed in the exposing portion 14. The DX code data may be used to recognize characters, figures and graphic information recorded in the DX code region as well as to analyze the contents of the DX code.

Then, the CPU 100 extracts data for detecting the position of the frame stored in the frame-position detecting data memory 86 to subject the density values of the plurality of the frame position detecting regions indicated by the frame position detecting data to comparisons for each detecting region for a plurality of lines. Depending on whether or not the density level has been changed by a degree exceeding a predetermined value, whether or not an image exists on the negative film 10 and the position of the frame of a specific image (the position of the edge of a specific image recorded on the negative film 10 in the lengthwise direction of the film) are detected. Since data for detecting the position of the frame is in the form of a data format with which the position of the frame of the image can easily be detected as compared with photometric data, detection of the position of the frame can be completed in a short time as compared with a structure in which photometric data is used.

Data for detecting the position of the frame may be used for detecting the position of a piece negative film in the form of an elongated roll formed by connecting a plurality of piece-shape negative films (so-called piece negative films) with each other by splice tapes by detecting the portion connected by the splice tape.

The detected position of the frame of the specific image is used when effective image data is, by cutting, obtained from exposure controlling image data stored in the exposure controlling image data memory 94 to correspond to the specific image as described later. The foregoing position of the specific image is also used when the specific image is brought to the exposing position for exposing the specific image by the exposing portion 14.

The CPU 100 extracts data for detecting the size of the frame stored in the frame-size detecting data memory 90, and compares the respective density levels of the plural regions for detecting the size of the frame over a plurality of lines for each of the detection regions. In accordance with the result of the comparison, the CPU 100 determines the position of the edge of the specific image, the frame position of which has been detected, in the widthwise direction of the film to detect the size of the frame of the specific image.

The position of the edge of an image in the widthwise direction of the film can be determined in such a way that a search for a detecting region pair is performed which satisfies a condition that a specific detecting region has a density level which substantially coincides with the density of the film base for a plurality of lines and a detecting region adjacent to the specific detecting region has a density which is considerably changed for each line. A portion adjacent to the boundary between the detecting region pair satisfying the foregoing condition is determined to be the position of the edge in the widthwise direction of the film. In accordance with the determined position of the edge, the size of the frame of the image recorded on the negative film 10 can be detected. Since data for detecting the size of a frame is formed into a data format with which the size of the frame can easily be detected as compared with photometric data, detection of the size of the frame can be completed in a short time as compared with an operation using photometric data.

The detected size of the frame of the specific image is used when obtaining, by cutting, effective image data from image data for controlling exposure stored in the exposure controlling image data memory 94 to correspond to the specific image (as described later). In addition, the detected size is used when the light shielding range is switched by the negative mask 30 which is used when exposure of a specific image is exposed in the exposing portion 14. Since the exposure factor must be varied according to the size of the frame of the image which is exposed, the detected size of the specific image is used in calculation of the exposing condition of the specific image and in an operation for switching the optical magnification of the exposing lens 38 when the specific image is exposed.

Then, the CPU 100 cuts and extracts only effective image data corresponding to an actual image from image data for controlling exposure stored in the exposure controlling image data memory 94 to correspond to the specific image in accordance with the detected position and size of the frame of the specific image. In accordance with the extracted image data, the CPU 100 obtains a variety of characteristic quantities of the image (for example, light accumulated transmission density (LATD), average density and color tone of a main image portion (for example, a region corresponding to the face of a person)) for obtaining the exposing condition of the specific image by performing calculations.

Since image data for controlling exposure is formed into a data format with which the quantity of image characteristic of the image can easily be detected as compared with photometric data, the quantity of image characteristic can be detected in a short time as compared with a structure using photometric data. In accordance with the detected quantity of the image characteristic, the characteristics of the negative film 10 obtained in accordance with the detected type of the negative film 10 and the exposure factor determined in accordance with the size of the frame of the specific image and the like, the exposing conditions of the specific image are calculated and the calculated exposing conditions are stored in the main memory 102 or the like.

The above-mentioned detection of the position of the frame of the specific image, detection of the size of the frame and the calculation of the exposing conditions are repeated so that the exposing conditions for the image recorded on the negative film 10 are sequentially calculated and stored.

Simultaneously with the above-mentioned process, the CPU 100 sequentially extracts data for detecting the edge of the film stored in the film-edge detecting data memory 74 to monitor a change in the position of the edge of the negative film 10 indicated with the extracted data so as to determine whether or not the negative film 10 meanders and the degree of the meander. If the CPU 100 determines that the negative film 10 excessively meanders, the CPU 100 issues an alarm. The foregoing process corresponds to detection means of the present invention. Since data for detecting the film edge is formed into a data format with which the position of the edge of the photographic film can easily be detected as compared with photometric data, detection of the position of the edge of the photographic film can be completed in a short time as compared with the operation using photometric data.

If the negative film 10 meanders, also the positions of the regions (regions A, B and C) from which photometric data must be extracted by other sampling circuits are shifted undesirably. Therefore, a structure may be employed in which the determined quantity of meandering of the negative film 10 is outputted to each sampling circuit as a correcting value of the shifted position of the region which must be extracted. Moreover, whereby each sampling circuit corrects the address of the pixels in the region which must be extracted in accordance with the foregoing correcting value for sampling the photometric data.

The position of the edge of the negative film 10 may be used to determine the type (135-size film, 110-size film, IX240 film (APS film) or the like) of the negative film 10 by detecting the width of the negative film 10 in accordance with the edge positions of the two widthwise directional ends of the negative film 10, in addition to its use for detecting meandering of the negative film 10. The edges of the negative film 10 generally have notches (cut portions) formed at the position corresponding to the image which must be exposed to photographic paper. The positions of the notches formed in the lengthwise direction of the negative film 10 may be detected in accordance with the change in the position of the edge of the negative film 10, so as to further detect the position of the image frame in accordance with the detected positions of the notches.

Simultaneously with the above-mentioned process for calculating the exposing conditions, the CPU 100 extracts data for detecting the film movement stored in the film movement detecting data memory 78, and detects whether or not a change in the configuration of perforations takes place periodically in accordance with the extracted data indicating the configuration of perforation. Thus, the CPU 100 determines whether or not the negative film 10 is being moved normally at predetermined speed. If the CPU 100 determines that the negative film 10 is not being moved normally, the CPU 100 issues an alarm. Also the foregoing process corresponds to the detection means of the present invention.

Since the data for detecting film movement is formed into a data format with which the movement of the photographic film can easily be detected as compared with photometric data, detection of the state of movement of the photographic film can be completed in a short time as compared with an operation using photometric data. Since the IX240 film is formed such that images are recorded at positions which satisfy a predetermined positional relationship with the positions of the perforations in the film, the positions of the image frames can be detected on the basis of the data for detecting film movement.

The correspondences between "information which must be detected or obtained from a photographic film", "optical characteristic on the photographic film corresponding to information which must be detected or obtained" and "positions at which the optical characteristic on the photographic film exist" and those in the above-mentioned embodiment are shown in Table 1 (image data which is a kind of information which must be detected or obtained from the film will be described in a second embodiment).

TABLE 1

| (1) information which must be detected/obtained from film | (2) optical characteristic for detecting/ obtaining (1) | (3) region which must be metered (extracted) for detecting (2) |
|---|---|---|
| Type of film | DX code | DX code region |
| State of movement of film | Perforation | Perforation region |
| State of meandering of film | Position of the edge of film | Film edge region |
| Size of image | Position of horizontal edge of image | Image region |
| Position of recorded image | Position of vertical edge of image | Image region |
| Quantity of image characteristic | Image | Image region |
| Image data | Image | Image region |

On the other hand, the image passed through the photometric portion 12 is, in the exposing portion 14, exposed on to the photographic paper 42. That is, in accordance with the detected position of the frame of the image, the negative film 10 is moved in such a manner that the image is brought to the exposing position. Thereafter, the light shielding range realized by the negative mask 30 is switched in accordance with the detected size of the frame of the image. Subsequently, the exposing lens 38 is moved in accordance with the exposure factor which is determined in accordance with the size of the frame of the image. Thereafter, the exposing condition corresponding to the positioned image is extracted, and the position of each filter of the color correcting filter 34 and the period during which the black shutter 40 is opened are controlled in accordance with the extracted exposing condition. Thus, the image brought to the exposition position is exposed to photographic paper 42.

The above-mentioned process is repeated so that the images recorded on the negative film 10 loaded into the photographic film printer are sequentially exposed to the photographic paper 42. The photographic paper having the exposed images is, by a paper processor (not shown), subjected to processes including a color developing process, a bleaching and fixing process, a water washing process and a drying process. The photographic paper is thereafter cut into image frame sections, and then subjected to a sorting process and the like.

Second Embodiment

A second embodiment of the present invention will now be described. The same elements as those according to the first embodiment are given the same reference numerals and the same elements are omitted from description. FIG. 9 shows a control unit 50B for a photographic film printer according to the second embodiment. Since there are a plurality of CPUs and main memories provided for the control unit 50B in FIG. 9, the CPU 100 according to the first embodiment is called a "CPU for a control unit" 100' and the main memory 102 according to the first embodiment is called a "main memory for the control unit" 102'.

In the control unit 50B for the photographic film printer, an image-data sampling circuit 120 is connected to the data bus 60 and the address/control bus 70. A buffer memory 122 for image data serving as storage means (more specifically, a first storage portion) comprising an FIFO memory is connected to the image-data sampling circuit 120. The buffer memory 122 for image data is connected to an image processing CPU bus 124 (corresponding to a first bus).

The image-data sampling circuit 120 corresponds to the extracting means of the present invention and also to the processing means, which extracts only photometric data of the region C (the image region) from the photometric data sequentially outputted from the A/D converter 58 to the data bus 60 and stores the extracted photometric data in the buffer memory 122 for image data as high-resolution image data or integrate photometric data of a plurality of pixels and stores the integrated data in the buffer memory 122 for image data as low-resolution image data (image data for index).

Specifically, the image-data sampling circuit 120 may be structured as shown in FIG. 10. That is, the image-data sampling circuit 120 shown in FIG. 10 has a structure similar to that of the exposure controlling image data sampling circuit 92 according to the first embodiment. The image-data sampling circuit 120 comprises a R-pixel integrating and calculating circuit 120A, a G-pixel integrating and calculating circuit 120B, a Blue-pixel integrating and calculating circuit 120C and a C-region (image region) sampling circuit 120D. The difference lies in that the pixel integrating and calculating circuits 120A to 120C are connected to an image processing CPU bus 124 (in a manner omitted in FIG. 9), and in that mode selection signals are supplied from an image processing CPU 126 (to be described later) connected to the image processing CPU bus 124 to the pixel integrating and calculating circuits 120A to 120C.

The pixel integrating and calculating circuits 120A to 120C follow the signals supplied from the C-region sampling circuit 120D to extract only the photometric data corresponding to the image region (the region C shown in FIG. 2) of the negative film 10. However, if the processing mode selected in response to the mode selection signal is a normal mode, the pixel integrating and calculating circuits 120A to 120C respectively integrate photometric data for each color component of the region composed of a plurality of number of pixels (for example, a region composed of 6 pixels×6 pixels) in the direction of the line (in the main scanning direction) and the direction (in the sub-scanning direction) in which the film is moved, and output the thus integrated data to the buffer memory 122 for image data as low-resolution image data (for example, image data of 750 pixels×500 pixels×three colors per each frame) for index.

If the processing mode selected in response to the mode selection signal is a high-resolution mode, the pixel integrating and calculating circuits 120A to 120C do not integrate the pixels of the extracted photometric data and output the extracted photometric data to the buffer memory 122 for image data as high-resolution image data (for example, image data of 4500 pixels×3000 pixels×three colors per each frame).

Connected to the image processing CPU bus 124 are an image processing CPU 126 (first processing means) only for processing image data stored in the buffer memory 122, a main memory 128 for an image processing portion having programs which are performed in the image processing CPU 126 and various data items stored therein, an image memory 106 having a large capacity for storing the image data temporarily stored in the buffer memory 122 and an image data I/F circuit 130 serving as an interface for transferring the image data to an external unit. The buffer memory 122 for image data is provided with a DMA (Direct Memory Access) circuit so that transference of the image data from the buffer memory 122 to the image memory 106 is performed at high speed in the burst mode.

In the structure shown in FIG. 9, the CPU 100 of the control portion corresponds to the second processing means and the CPU bus 68 corresponds to a second bus. The film-edge detecting data memory 74, the film movement detecting data memory 78, the DX code data memory 82, the frame-position detecting data memory 86, the frame-size detecting data memory 90 and the exposure controlling image data memory 94 correspond to the second storage portion.

A process which is performed by the image processing CPU 126 according to the second embodiment will now be described. The following process corresponds to a process which is performed by the first processing means.

The image processing CPU 126 outputs, to the image-data sampling circuit 120, a mode selection signal for selecting a normal mode when an index print in which a plurality of images are disposed in a matrix configuration or when a list of images recorded on the negative film 10 is displayed on a display unit or the like. As a result, the image-data sampling circuit 120 outputs low-resolution index image data so that the index image data is stored in the image memory 106 through the buffer memory 122.

After the operation for resetting the charge accumulating time has been performed as described in the first embodiment, the dynamic range of the photometric operation can be widened, and the image region can be metered with a significant precision. Therefore, the number of gradients of index image data obtained by integrating the photometric data can substantially be increased. Thus, image data which is capable of further precisely expressing the gradient of the image can be obtained.

The image processing CPU 126 performs negative-to-positive conversion of the index image data stored in the image memory 106 and modifies the density and the color tone in accordance with the exposing conditions calculated by the CPU of the control portion 100' so as to sequentially transfer, to an external unit, the modified index image data through the image data I/F circuit 130. The external unit in this case is an index printer for making an index print or a display apparatus comprising a display means, such as a display unit, and a display control means for controlling display of an image on the display means. As a result, the index print can be made and display on the display unit can be performed.

Note that display on the display unit may be performed prior to making the index print to enable an operator to check the density and color tone of the image displayed on the display unit so as to cause information for instructing modification of the density and the color tone to be input if necessary. If information for instructing the modification is received through the image data I/F circuit 130, the image processing CPU 126 further modifies the index image data in accordance with the thus received information, and then outputs the modified index image data to the index printer. As a result, the quality of the image obtainable by the index print can be improved.

When a so-called digital image file service is performed such that high-resolution image data of the images recorded on the negative film 10 is provided for the external unit, the image processing CPU 126 outputs a mode selection signal for selecting a high-resolution mode to the image-data sampling circuit 120. As a result, high-resolution image data is outputted from the image-data sampling circuit 120 so that high-resolution image data is stored in the image memory 106 through the buffer memory 122. After the operation for resetting the charge accumulating period has been performed as described in the first embodiment, the dynamic range of the photometric operation can be widened as described above and thus the image region can be metered at significant accuracy. Therefore, also the number of gray levels of the precise image data can substantially be increased. Thus, image data precisely expressing the gray scale of the image can be obtained. The image from which high-resolution image data is outputted may be all images on the negative film 10 or specific images instructed among the plural images displayed on the display unit as a list or specific images instructed with the frame numbers.

The image processing CPU 126 performs a negative-to-positive conversion of high-resolution image data stored in the image memory 106 and modifies the density and color tone in accordance with the exposing condition calculated by the CPU of the control portion 100' to process high-resolution image data into a digital image output file, whose resolution can be changed. Then, the image processing CPU 126 transfers the digital image output file to the external unit through the image data I/F circuit 130. The external unit may be a storage unit having a storage medium, such as a floppy disk, a removable hard disk or a magneto-optical disk, or a network.

As described above, the second embodiment is arranged such that the process of image data (index image data and precise image data) having a large quantity is performed by the image processing CPU 126. Therefore, the load generated by performing various processes can be distributed to the CPU of the control portion 100' and the image processing CPU 126. As a result, there will be no such problem that the process, which is performed by the CPU 100 in the first embodiment (and which is performed by the CPU 100' in the second embodiment), is delayed even if the process of image data in the second embodiment is performed.

Although the negative film has been described as the photographic film, another photographic film, such as a reversal film, may be employed.

Although the above-mentioned embodiments have the structure that each of sampling circuits 72, 76, 80, 84, 88, 92 and 120 samples photometric data in a fixedly determined region on the photographic film, the region is not limited to this. The portion on the photographic film, from which photometric data is extracted, may be made changeable. This structure can be realized by forming the sampling circuit in such a manner that the address (the line address) of the pixel corresponding to photometric data which must be extracted (sampled) can be changed from outside. As a result, even if information, which must be detected or obtained from the photographic film, is undefined, each sampling circuit is able to sample photometric data of a portion corresponding to information which must be detected of obtained.

Although the line sensor has been described as the photometric means which comprises light receiving devices (CCD cells) disposed in the line configuration, an area sensor having light receiving devices disposed in a planar configuration may be employed to be adaptable to a second aspect of the present invention. A CCD area sensor 140 shown in FIG. 11 has a photometric range in the lengthwise direction of the film to have a length which covers the overall surface of one image frame. In this case, also a light reducing filter 142 (indicated by a dense hatching shown in FIG. 11) serving as the light reducing means is required to have a length in the lengthwise direction of the film which is the same as the photometric range.

Although all of light beams, which are made incident on the CCD from a portion outside the image range, are reduced by the light reducing filter, the structure is not limited to this. For example, the light reducing filter may reduce only light beams allowed to pass through the region (the region D) in which film edges are positioned and which includes the region (the region B) having perforations and the region having notches.

Although the above-mentioned structure is formed such that the density of the film base is determined in accordance with the detected type of the film to determine the charge accumulating time, another structure may be employed in which the density of the film base is detected in accordance with the result of the operation of metering the through portion on the film so as to determine the charge accumulating period. As a result, optimal charge accumulating period can be determined even for a negative film, for example, having film base, whose density is changed in accordance with a lapse of time.

Although the above-mentioned structures are constructed such that the charge accumulating period is set (specifically, reset) in accordance with the density of the film base of the negative film 10 which is different depending on the type of the film, a photometric operation (a previous photometric operation) of an image may be performed prior to performing the major photometric operation in accordance to obtain image data, wherein a lowest density in the image region is obtained in accordance with the result of the photometric operation to determine the charge accumulating period in such a manner that the quantity of charges accumulated in the CCD cell for receiving a light beam from the portion in the image region having the lowest density substantially coincides with the maximum quantity of charges which can be accumulated in the CCD cell and saturation of accumulated charges does not take place (this process corresponds to an adjustment of the photometric condition). As a result, when an image of an overexposure type having a high density is metered, the image can accurately be metered with a wide dynamic range. The photometric means may be a MOS sensor or the like in place of the CCD.

Although the foregoing embodiments have the structure in which the light reducing filter is disposed on the light receiving surface of the photometric means (adjacent to a position at which a light beam made incident on the photometric means is imaged), the position is not limited to this. The light reducing filter may be disposed adjacent to the negative film 10.

Although the description has been performed about the structure in which the film information obtaining apparatus according to the present invention is applied to the photographic film printer, the structure is not limited to this. For example, the present invention may be applied to an image reading apparatus or the like which reads images recorded on a photographic film.

As described above, the aspect claimed in claim 1 of the present invention is formed such that photometric data of a portion on a photographic film in which a predetermined optical characteristic corresponding to information, which must be detected or obtained from the photographic film, exists is extracted from photometric data outputted from a photometric means, and the extracted photometric data is stored in storage means. Therefore, an excellent effect can be obtained in that the structure can be simplified and various information items, which must be detected or obtained from the photographic film, can be detected or obtained in a short time.

The aspect of the present invention in which when plural types of information items are detected or obtained from a photographic film, extraction of photometric data of portions in which optical characteristics on the photographic film which correspond to any one of the plural types of information items, which must be detected or obtained exist is performed to correspond to the plural types of information items to cause the plural types of extracted photometric data to relate to the plural types of information items to one another and store the plural type of the extracted information items. Therefore, even if plural types of information items are detected or obtained from a photographic film, an effect can be obtained in that the plural types of information items can be detected or obtained in a short time.

The aspect of the present invention according to the foregoing aspects has a structure that photometric data inputted from the extracting means is processed in accordance with the data format of information which corresponds to photometric data and which must be detected or obtained, and then stored in the storage means. Thus, detection of various information items can be completed in a shorter time in addition to the above-mentioned effect. Moreover, another effect can be obtained in that the storage capacity of the storage means can be reduced.

The aspect of the present invention according to the foregoing aspects has a structure further comprising first processing means for subjecting photometric data corresponding to image data stored in the storage means to a first predetermined process and second processing means for subjecting photometric data corresponding to information except for the image data stored in the storage means to a second process. Therefore, an effect can be obtained in that the time required for detecting or obtaining plural types of information items from the photographic film can furthermore be shortened in addition to the above-mentioned effects.

The aspect of the present invention according to the foregoing aspect has a structure such that the storage means is composed of a first storage portion connected to a first bus to store photometric data corresponding to image data and a second storage portion connected to a second bus to store photometric data corresponding to information except for the image data. Moreover, the first processing means is connected to the first bus and the second processing means is connected to the second bus. Therefore, an effect can be obtained in that the process of the photometric data stored in the first storage portion does not obstruct the process of the photometric data stored in the second storage portion in addition to the above-mentioned effects.

The second aspect of the present invention is arranged such that a predetermined range larger than an image recording range on a photographic film is divided into a multiplicity of sections and metered by a single photometric means. Moreover, a light beam made incident on the photometric means from a region in the predetermined range on the photographic film and outside the image recording range is reduced by the reducing means. Therefore, an excellent effect can be obtained in that the single photometric means is able to meter with high accuracy an image recorded on a photographic film and the information relating to the photographic film can accurately be detected also from a portion on the outside the image recording range of the photographic film.

The second aspect of the present invention is arranged such that the optical filter having a spectral characteristic approximating the spectral characteristic of the film base of the photographic film is employed as a light reducing means. Therefore, in addition to the above-mentioned effects, an effect can be obtained in that detection of various information items from a portion outside the image recording range on the photographic film can accurately be performed even if photometric means with a structure to decompose incidental light into respective color components and having sensitivity for each color component adjusted in such a manner that the color tone of a through portion in the image recording range of the photographic film is detected as a white portion is employed.

In the same aspect, the light reducing means is an optical filter arranged such that the transmittance of blue light Tb ≦ transmittance of green light Tg ≦ transmittance of red light Tr. In addition to the above-mentioned effects, an effect can be obtained in that detection of various information items from a portion outside the image recording range on the photographic film can accurately be performed even if a negative film is employed as a photographic film and photometric means according to the present invention is the one having a structure to decompose incidental light into respective color components and meter the light beam, and also provided with sensitivity for each color component in such a manner that the color tone of a through portion in the image recording range of the photographic film is detected as a white portion as a result of the photometric operation.

What is claimed is:

1. An apparatus for obtaining information of a film, comprising:

single photometric means for dividing photographic film into a multiplicity of portions to meter the photographic film, and sequentially outputting photometric data of the multiplicity of portions in a predetermined range on the photographic film including an image recording range;

extracting means for extracting, from photometric data outputted from said photometric means, photometric data of portions on the photographic film, in which a predetermined optical characteristic corresponding to information, which must be detected or obtained from the photographic film, exists; and storage means for storing photometric data extracted by said extracting means wherein said photometric means includes a CCD line sensor having a red CCD cell array having a filter permitting a red light component to pass through and disposed on the incidental side, a green CCD cell array having a filter permitted a green light component to pass through and disposed on the incidental side and a blue CCD cell array having a filter permitting a blue light component to pass through and disposed on the incidental side in such a manner that said CCD cell arrays are disposed in parallel with one another in the direction of the width of the film and said CCD cell arrays are separated from one another for a predetermined distance.

2. An apparatus for obtaining information of a film according to claim 1, wherein said extracting means is a plurality of sampling circuits connected to a data bus to which photometric data corresponding to any one of plural types of information items obtained by said photometric means is transferred, and arranged to arbitrarily extract photometric data from said data bus.

3. An apparatus for obtaining information of a film according to claim 2, wherein said storage means is composed of a plurality of memories connected to said plural sampling circuits and arranged to store plural types of information to be related to each of the plural types of information when the plural types of information are detected or obtained from the photographic film.

4. An apparatus for obtaining information of a film according to claim 3, wherein said extracting means is able to change the portion on the photographic film from which photometric data outputted from said photometric means is extracted, and said extracting means changes the portion on the photographic film from which photometric data is extracted in accordance with the type of information which must be detected or obtained from the photographic film.

5. An apparatus for obtaining information of a film according to claim 3, further comprising processing means for processing photometric data to be stored in said storage means, such that said photometric data is converted to a data format of information which corresponds to data which must be detected or obtained.

6. An apparatus for obtaining information of a film, comprising:

single photometric means for dividing photographic film into a multiplicity of portions to meter the photographic film, and sequentially outputting photometric data of the multiplicity of portions in a predetermined range on the photographic film including an image recording range;

extracting means for extracting, from photometric data outputted from said photometric means, photometric data of portions on the photographic film, in which a predetermined optical characteristic corresponding to information, which must be detected or obtained from the photograhic film, exists;

storage means for storing photometric data extracted by said extracting means wherein information, which must be detected or obtained, is any one of the type and state of the photographic film, the size and the recorded position of an image recorded on the photographic film and the quantity of the characteristic of the image, and said apparatus further comprises processing means for detecting the type and state of the photographic film, the size and the recorded position of the image recorded on the photographic film and the quantity of the characteristic of the image indicting the density, the hue or the like of the image in accordance with photometric data stored in said storage means.

7. An apparatus for obtaining information of a film, comprising:

single photometric means for dividing photographic film into a multiplicity of portions to meter the photographic film, and sequentially outputting photometric data of the multiplicity of portions in a predetermined range on the photographic film including an image recording range;

extracting means for extracting, from photometric data outputted from said photometric means, photometric data of portions on the photographic film, in which a predetermined optical characteristic corresponding to information, which must be detected or obtained from the photographic film, exists;

storage means for storing photometric data extracted by said extracting means wherein one of information items, which must be detected or obtained, is image data which can be obtained by metering an image recorded on the photographic film, and said apparatus further comprises; and first processing means for subjecting photometric data corresponding to information except for the image data stored in said storage means to a first predetermined process, and second processing means for subjecting photometric data corresponding to information except for the image data stored in said storage means to a second predetermined process.

8. An apparatus for obtaining information of a film according to claim 7, wherein said storage means is composed of a first storage portion connected to a first bus and arranged to store photometric data corresponding to the image data and a second storage portion connected to a second bus and arranged to store photometric data corresponding to information except for the image data, wherein said first processing means is connected to said first bus and said second processing means is connected to said second bus.

9. An apparatus for obtaining information of a film, comprising:

single photometric means for dividing photographic film into a multiplicity of portions to meter the photographic film, and sequentially outputting photometric data of the multiplicity of portions in a predetermined range on the photographic film including an image recording range;

extracting means for extracting, from photometric data outputted from said photometric means, photometric data of portions on the photographic film, in which a predetermined optical characteristic corresponding to information, which must be detected or obtained from the photographic film, exists;

storage means for storing photometric data extracted by said extracting means light reducing means for reducing a light beam made incident on said photometric means for a region outside said image recording range; and photometric condition adjusting means for adjusting the photometric condition adapted to said photometric means to the condition corresponding to the quantity of light made incident on said photometric means from said image recording range.

10. An apparatus for obtaining information of a film according to claim 9, wherein said photometric condition adjusting means adjusts the photometric condition in such a manner that a level of a signal outputted from said photometric means corresponding to a light beam from a density through portion is not saturated, yet the level is made to be substantially a highest level when the density through portion, the density of which substantially coincides with the density of the film base of the photographic film, exists in said image recording range.

11. An apparatus for obtaining information of a film according to claim 9, wherein said photometric condition adjusting means detects a lowest density portion in the image recording range on the photographic film and adjusts the photometric condition in such a manner that the level of a signal outputted from the photometric means corresponding to a light beam from the lowest density portion is not saturated, yet the level is made to be substantially a highest level.

12. An apparatus for obtaining information of a film according to claim 9, wherein said light reducing means is an optical film having a spectral characteristic approximating the spectral characteristic of a film base of the photographic film.

13. An apparatus for obtaining information of a film comprising:

irradiation means for irradiating a predetermined range larger than an image recording range on a photographic film with a light beam;

single photometric means on which a light beam is made incident from said predetermined range on the photographic film, which divides said predetermined range into a multiplicity of portions to meter the multiplicity of the portions and which sequentially outputs photometric data of the portions;

light reducing means for reducing a light beam made incident on said photometric means from a region in said predetermined range yet outside said image recording range on the photographic film;

photometric condition adjusting means for adjusting a photometric condition of said photometric means to a condition corresponding to the quantity of the light beam made incident on said photometric means from the image recording range; and detecting means for detecting a predetermined information item existing outside the image recording range on the photographic film in accordance with a result of the photometric operation of a region in said predetermined range yet outside the image recording range.

14. An apparatus for obtaining information of a film according to claim 13, wherein said photometric condition adjusting means adjusts the photometric condition in such a manner that the level of a signal outputted from said photometric means corresponding to a light beam from a density through portion is not saturated, yet the level is made to be substantially a highest level when the density through portion, the density of which substantially coincides with the density of the film base of the photographic film, exists in said image recording range.

15. An apparatus for obtaining information of a film according to claim 13, wherein said photometric condition adjusting means detects a lowest density portion in the image recording range on the photographic film and adjusts the photometric condition in such a manner that the level of a signal outputted from the photometric means corresponding to a light beam from the lowest density portion is not saturated, yet the level is made to be substantially a highest level.

16. An apparatus for obtaining information of a film according to claim 13, wherein said light reducing means is an optical film having a spectral characteristic approximating the spectral characteristic of the film base of the photographic film.

17. An apparatus for obtaining information of a film according to claim 13, wherein said light reducing means is an optical film arranged in such a manner that transmittance of blue light $Tb \leq$ transmittance of green light $Tg \leq$ transmittance of red light $Tr$.

* * * * *